(12) United States Patent
Heitsch et al.

(10) Patent No.: US 12,540,204 B2
(45) Date of Patent: Feb. 3, 2026

(54) LOW DENSITY POLYETHYLENE WITH IMPROVED PROCESSABILITY

(71) Applicant: DOW GLOBAL TECHNOLOGIES LLC, Midland, MI (US)

(72) Inventors: Andrew T. Heitsch, Angleton, TX (US); Teresa P. Karjala, Lake Jackson, TX (US); Lori L. Kardos, Sugar Land, TX (US); Cassie A. Cunningham, Lake Jackson, TX (US); Jose Ortega, Lake Jackson, TX (US); David T. Gillespie, Pearland, TX (US); Venkata Krishna Sai Pappu, Pearland, TX (US); John P. O'Brien, Manvel, TX (US); Daniel W. Baugh, III, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 807 days.

(21) Appl. No.: 17/614,275

(22) PCT Filed: May 29, 2020

(86) PCT No.: PCT/US2020/035115
§ 371 (c)(1),
(2) Date: Nov. 24, 2021

(87) PCT Pub. No.: WO2020/243426
PCT Pub. Date: Dec. 3, 2020

(65) Prior Publication Data
US 2022/0251255 A1    Aug. 11, 2022

Related U.S. Application Data

(60) Provisional application No. 62/855,455, filed on May 31, 2019.

(51) Int. Cl.
*C08F 110/02*    (2006.01)
*C08L 23/06*    (2006.01)

(52) U.S. Cl.
CPC .......... *C08F 110/02* (2013.01); *C08L 23/06* (2013.01); *C08L 2205/025* (2013.01)

(58) Field of Classification Search
CPC ...... C08F 10/02; C08F 110/02; C08F 210/02; C08L 23/06; C08L 23/08; C08L 23/0807; C08L 23/0815
See application file for complete search history.

(56) References Cited

U.S. PATENT DOCUMENTS

| | | |
|---|---|---|
| 3,645,992 A | 2/1972 | Elston |
| 3,914,342 A | 10/1975 | Mitchell |
| 4,076,698 A | 2/1978 | Anderson et al. |
| 5,272,236 A | 12/1993 | Lai et al. |
| 5,278,272 A | 1/1994 | Lai et al. |
| 5,582,923 A | 12/1996 | Kale et al. |
| 5,773,155 A | 6/1998 | Kale et al. |
| 5,844,045 A | 12/1998 | Kolthammer et al. |
| 5,869,575 A | 2/1999 | Kolthammer et al. |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 7,741,415 B2 | 6/2010 | Conrad et al. |
| 8,822,601 B2 | 9/2014 | Karjala et al. |
| 8,871,887 B2 | 10/2014 | Karjala et al. |
| 8,916,667 B2 | 12/2014 | Karjala et al. |
| 9,228,036 B2 | 1/2016 | Berbee et al. |
| 9,303,107 B2 | 4/2016 | Karjala et al. |
| 9,765,160 B2 | 9/2017 | Den Doelder et al. |
| 2008/0125553 A1 | 5/2008 | Conrad et al. |

FOREIGN PATENT DOCUMENTS

| | | |
|---|---|---|
| EP | 2239283 B1 | 4/2010 |
| EP | 2393852 A1 | 12/2011 |
| EP | 2917267 A1 | 9/2015 |
| WO | 2006/049783 A1 | 5/2006 |
| WO | 2009064452 A2 | 5/2009 |
| WO | 2009/0114661 A1 | 9/2009 |
| WO | 2010/042390 A1 | 4/2010 |
| WO | 2010/0144784 A1 | 12/2010 |
| WO | 2011/019563 A1 | 2/2011 |
| WO | 2012/082393 A1 | 6/2012 |
| WO | 2017/146981 A1 | 8/2017 |

OTHER PUBLICATIONS

Chinese Office Action, dated Apr. 28, 2023, pertaining to Chinese Patent Application No. 202080040313.2 14 pages.
Brazil Office Action dated Sep. 4, 2023, pertaining to BR Patent Application No. BR112021023912, 10 pgs.
Balke et al., " A Strategy for Interpreting Multidetector Size-Exclusion Chromatography Data II", Chromatogrpahy of Polymers, Apr. 20, 1992, Chapter 13, pp. 199-219.
Balke et al., " A Strategy for Interpreting Multidetector Size-Exclusion Chromatography Data I", Chromatogrpahy of Polymers, Apr. 20, 1992, Chapter 12, pp. 180-198.
Bruno H. Zimm, "Apparatus and Methods for Measurement and Interpretation of the Angular Variation of Light Scattering; Preliminary Results on Polystrene Solutions", The Journal of Chemical Physics, vol. 16, No. 12, Dec. 1948, pp. 1099-1116.
Kratochvil, P., Classical Light Scattering from Polymer Solutions, Elsevier, Oxford, NY (1987).

(Continued)

*Primary Examiner* — Jeffrey S Lenihan
(74) *Attorney, Agent, or Firm* — Dinsmore & Shohl LLP

(57) ABSTRACT

A low density polyethylene (LDPE) having a z-average molecular weight Mz (cony) from 425,000 g/mol to 800,000 g/mol, a melt index $I_2$ less than or equal to 0.20 g/10 min, and a conventional GPC Mw/Mn from 8.0 to 10.6. A LDPE having a GPC-light scattering parameter (LSP) less than 2.00, a ratio of viscosity measured at 0.1 radians/second and 190° C. to a viscosity measured at 100 radians/second and 190° C. that is greater than 50, and a z-average molecular weight Mz (cony) from 425,000 g/mol to 800,000 g/mol.

20 Claims, 3 Drawing Sheets

(56) References Cited

OTHER PUBLICATIONS

161/162 Communication for Application No. 20746360.5 issued Jan. 12, 2022, pp. 1-3.
International Preliminary Report on Patentability for Appliction No. PCT/US2020/035115 dated Nov. 16, 2021, pp. 1-7.
Communication pursuant to Article 94(3), dated Jun. 15, 2023, pertaining to European Patent No. 20746360.5, 6 pages.
Indian Examination Report, dated Aug. 8, 2023, pertaining to Indian Patent Application No. 202117055442, 5 pages.
International Search Report and Written Opinion issued by the European Patent Office acting as International Searching Authority for International Patent Application PCT/US2020/035115 dated Sep. 10, 2020 (13 total pages).
Communication pursuant to Article 94(3) EPC dated Sep. 30, 2024, pertaining to EP Patent Application No. 20746360.5, 6 pgs.
Japanese Office Action dated Jun. 4, 2024, pertaining to JP Patent Application No. 2021-569912, 9 pgs.
Brazilian Office Action dated Nov. 12, 2024, pertaining to BR Patent Application No. BR112021023912,0, 6 pgs.
Korean Office Action dated Mar. 26, 2025, pertaining to KR Patent Application No. 10-2021-7041828, 12 pgs.
Brazilian Office Action dated Apr. 1, 2025, pertaining to BR Patent Application No. BR112021023912,0, 3 pgs.

LOW DENSITY POLYETHYLENE WITH IMPROVED PROCESSABILITY

CROSS-REFERENCE TO RELATED APPLICATIONS

This application is a National Stage Entry under 35 U.S.C. § 371 of International Patent Application No. US2020/035115, filed May 29, 2020, which claims priority to U.S. Provisional Patent Application No. 62/855,455, filed on May 31, 2019, the entire disclosures of which are hereby incorporated by reference.

TECHNICAL FIELD

Embodiments of the present disclosure generally relate to low density polyethylene (LDPE), and particularly to LDPE with a fractional melt index, high melt strength, and good processability.

BACKGROUND

Blown film production lines are typically limited in output by bubble stability. Blending LDPE with Linear Low Density Polyethylene (LLDPE) increases bubble stability, in part due to the higher melt strength of the LDPE. This increase in melt strength of a LDPE can result in an increase in film output and can allow for a reduction in the total amount of LDPE usage for a LLDPE/LDPE formulation with equivalent film output when compared to the use of a more standard or traditional LDPE. However, too high a melt strength can cause gels and poor quality film. Furthermore, too high of a melt strength can potentially limit drawdown capabilities to thinner gauges (1 mil or below) film. High melt strength resins also typically have reduced optics and toughness properties. Thus, there is a need for new ethylene-based polymers, such as LDPEs, that have an improved melt strength and an optimized balance of film optical and mechanical properties, for blown film applications.

LDPE polymers are disclosed in the following references: WO 2010/042390, WO 2010/144784, WO 2011/019563, WO 2012/082393, WO 2006/049783, WO 2009/114661, US 2008/0125553, U.S. Pat. Nos. 7,741,415, 8,916,667, 9,303,107, and EP 2239283B1. However, such polymers do not provide an improved melt strength and an optimized balance of film optical properties and film mechanical properties. Thus, there remains a need for new ethylene-based polymers, such as LDPEs, that have an optimized balance of melt strength, optics, processability and output, and toughness.

SUMMARY

In an embodiment, a low density polyethylene (LDPE) comprises: a z-average molecular weight Mz (cony) that is greater than 425,000 g/mol and less than or equal to 800,000 g/mol; a melt index $I_2$ measured at 190° C. that is less than or equal to 0.20 g/10 min; and a conventional GPC Mw/Mn that is greater than or equal to 8.0 and less than or equal to 10.6.

In an embodiment, a LDPE comprises: a GPC-light scattering parameter (LSP) less than 2.00; a ratio of viscosity measured at 0.1 radians/second and 190° C. to a viscosity measured at 100 radians/second and 190° C. that is greater than 50; and a z-average molecular weight Mz (cony) that is greater than 425,000 g/mol and less than or equal to 800,000 g/mol.

Additional features and advantages will be set forth in the detailed description that follows, and in part will be readily apparent to those skilled in the art from that description or recognized by practicing the embodiments described herein, including the detailed description, which follows, the claims, as well as the appended drawing.

It is to be understood that both the foregoing general description and the following detailed description describe various embodiments and are intended to provide an overview or framework for understanding the nature and character of the claimed subject matter. The accompanying drawing is included to provide a further understanding of the various embodiments, and is incorporated into and constitutes a part of this specification. The drawing illustrates the various embodiments described herein, and together with the description serve to explain the principles and operations of the claimed subject matter.

DETAILED DESCRIPTION

Figure 1:
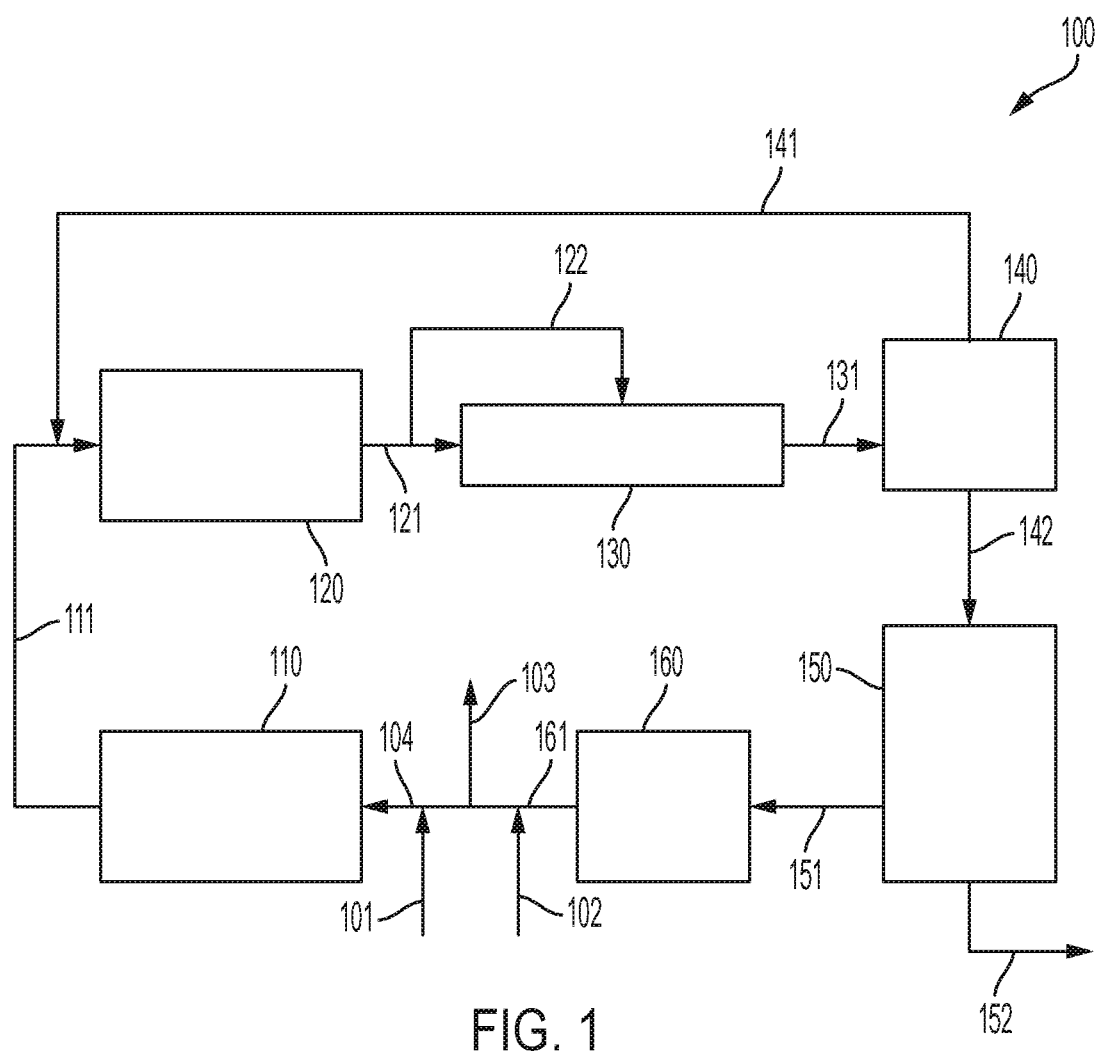
FIG. 1 schematically depicts a process system according to embodiments disclosed and described herein.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

According to embodiments, a low density polyethylene (LDPE) comprises: a z-average molecular weight Mz (cony) that is greater than 425,000 g/mol and less than or equal to 800,000 g/mol; a melt index $I_2$ measured at 190° C. that is less than or equal to 0.20 g/10 min; and a conventional GPC Mw/Mn that is greater than or equal to 8.0 and less than or equal to 10.6. According to embodiments, a LDPE comprises: a GPC-light scattering parameter (LSP) less than 2.00; a ratio of viscosity measured at 0.1 radians/second and 190° C. to a viscosity measured at 100 radians/second and 190° C. that is greater than 50; and a z-average molecular weight Mz (cony) that is greater than 425,000 g/mol and less than or equal to 800,000 g/mol.

Definitions

The term "composition," as used herein, includes a mixture of materials that comprise the composition, as well as reaction products and decomposition products formed from the materials of the composition.

The terms "blend" or "polymer blend," as used, refers to a mixture of two or more polymers. A blend may or may not be miscible (phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "low-density polyethylene" abbreviated as "LDPE," as used herein, may also be referred to as "high pressure ethylene polymer" or "highly branched polyethylene" and, as used herein, is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. Nos. 8,916,667, 8,871, 887, 8,822,601, 9,228,036, and 9,765,160, which are hereby incorporated by reference). LDPE resins typically have a density in the range of 0.915 to 0.935 g/cm$^3$.

The term "linear low density polyethylene" abbreviated as "LLDPE," as used herein, includes resin made using Ziegler-Natta catalyst systems as well as resin made using single-site catalysts, including, but not limited to, bis-metallocene catalysts (sometimes referred to as "m-LLDPE" or metallocene-LLDPE), phosphinimine, and constrained geometry catalysts; and resin made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs include the substantially linear ethylene polymers, which are further defined in U.S. Pat. Nos. 5,272,236; 5,278,272; 5,582,923; and 5,773,155; the homogeneously branched ethylene polymers such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342). The LLDPE resins can be made via gas-phase, solution-phase or slurry polymerization or any combination thereof, using any type of reactor or reactor configuration known in the art.

Process of Embodiments

Reference will now be made in detail to systems for producing ethylene-based polymers according to embodiments disclosed and described herein.

With reference now to FIG. 1, which is a block diagram of the process reaction system used to produce LDPE according to embodiments, the process reaction system 100 shown in FIG. 1 is a partially closed-loop, dual recycle, high-pressure, LDPE production system. In the process reaction system 100 a fresh ethylene feed line 101 is mixed with a high ethylene stream 161—that is an exit stream of booster 160—and a chain transfer agent (CTA) stream 102 to form a mixed stream 104 (i.e., a mixed stream of fresh ethylene feed line 101, high ethylene stream 161, and CTA stream 102). This mixed stream 104 is introduced into a primary compressor 110 that is sequentially connected to a booster 160, which is upstream from the primary compressor 110, and is sequentially connected to a hypercompressor 120, which is downstream from the primary compressor 110. In the primary compressor 110, the mixed stream 104 is compressed and exits the primary compressor 110 as compressed stream 111.

The compressed stream 111 is introduced to a hypercompressor 120 that is sequentially connected to the primary compressor 110, which is upstream of the hypercompressor 120, and sequentially connected to a reactor 130, which is downstream of the hypercompressor 120. At the hypercompressor 120, the compressed stream 111 is compressed further into a hypercompressed stream 121 that exits the hypercompressor 120.

The hypercompressed stream 121 is introduced into a reactor 130 that is sequentially connected to the hypercompressor 120, which is upstream from the reactor 130, and sequentially connected to a high pressure separator (HPS) 140, which is downstream from the reaction 130. A side stream 122 is separated from the hypercompressed stream 121, such as, for example by a splitter (not shown) and introduced into the reactor 130 as a side stream 122. In the reactor 130, the hypercompressed stream 121 and the side stream 122 are polymerized and exits the reactor 130 as polymerized stream 131.

According to embodiments, the polymerization is initiated in the reactor 130 with the aid of four mixtures, each containing one or more free radical initiation systems that may be injected at the inlet of each reaction zone (not shown). The maximum temperature in each reaction zone is controlled at a set point by regulating the feed amount of the mixture of initiators at the start of each reaction zone. Each reaction zone has one inlet and one outlet. Each inlet stream consists of the outlet stream from the previous zone and/or added ethylene-rich feed stream.

According to embodiments, the initiator added to the first and second reaction zones within the reactor 130 may be selected from the group consisting of t-butyl peroxypivalate (TBPIV), t-butyl peroxy-2 ethylhexanoate (TBPO), tert-butyl peroxyacetate (TBPA), di-tert-butyl peroxide (DTBP), and mixtures thereof. It should be understood that in embodiments, each initiator may be added to the first reaction zone as a separate stream and each separate stream may be added to the first reaction zone at a different flow rate. As a non-limiting example, a mixture of TBPIV, TBPO, TBPA, and DTBP may be added to the first reaction zone as four separate streams. The TBPIV may be added to the first reaction zone at a first flow rate, the TBPO may be added to the first reaction zone at a second flow rate, the TBPA may be added to the first reaction zone at a third flow rate, and the DTBP may be added to the first reaction zone at a fourth flow rate. The first flow rate, the second flow rate, the third flow rate, and the fourth flow rate may all be the same, may all be different, or any individual flow rate may be the same as another individual flow rate. It should be understood that in embodiments, each initiator may be added to the second reaction zone as a separate stream and each separate stream may be added to the second reaction zone at a different flow rate.

The initiator added to the third and fourth reaction zones within the reactor may be selected from the group consisting of TBPA, DTBP, and mixtures thereof. It should be understood that in embodiments each initiator may be added to the third reaction zone as a separate stream and each separate stream may be added to the third reaction zone at a different flow rate. It should be understood that in embodiments each initiator may be added to the fourth reaction zone as a separate stream and each separate stream may be added to the fourth reaction zone at a different flow rate.

According to embodiments, the pressure within the reactor 130 may be the same in each reaction zone and may be greater than or equal to 30,000 pounds per square inch gauge (psig) and less than or equal to 50,000 psig, such as greater than or equal to 35,000 psig and less than or equal to 45,000 psig, greater than or equal to 38,000 psig and less than or equal to 42,000 psig, or about 39,900 psig. Each reaction zone within the reactor 130 may have a different initiation and peak temperature. In embodiments, the first reaction zone may have an initiation temperature of greater than or equal to 130° C. and less than or equal to 150° C., such as greater than or equal to 135° C. and less than or equal to 145° C., greater than or equal to 140° C. and less than or equal to 145° C., or about 142° C. The first reaction zone may, according to embodiments, have a peak temperature of greater than or equal to 265° C. and less than or equal to 305° C., such as greater than or equal to 275° C. and less than or equal to 295° C., greater than or equal to 280° C. and less than or equal to 290° C., or about 285° C. In embodiments, the second reaction zone may have an initiation temperature of greater than or equal to 145° C. and less than or equal to 185° C., such as greater than or equal to 155° C. and less than or equal to 175° C., greater than or equal to 160° C. and less than or equal to 170° C., or about 166° C. The second reaction zone may, according to embodiments, have a peak temperature of greater than or equal to 290° C. and less than or equal to 330° C., such as greater than or equal to 300° C. and less than or equal to 320° C., greater than or equal to 305° C. and less than or equal to 315° C., or about 310° C. In embodiments, the third reaction zone may have an initiation temperature of greater than or equal to 235° C. and less than or equal to 275° C., such as greater than or equal to 245° C. and less than or equal to 265° C., greater than or equal to 250° C. and less than or equal to 260° C., or about 256° C. The third reaction zone may, according to embodiments, have a peak temperature of greater than or equal to 290° C. and less than or equal to 330° C., such as greater than or equal to 300° C. and less than or equal to 320° C., greater than or equal to 305° C. and less than or equal to 315° C., or about 308° C. In embodiments, the fourth reaction zone may have an initiation temperature of greater than or equal to 250° C. and less than or equal to 290° C., such as greater than or equal to 260° C. and less than or equal to 280° C., greater than or equal to 265° C. and less than or equal to 275° C., or about 271° C. The fourth reaction zone may, according to embodiments, have a peak temperature of greater than or equal to 270° C. and less than or equal to 310° C., such as greater than or equal to 280° C. and less than or equal to 300° C., greater than or equal to 285° C. and less than or equal to 295° C., or about 288° C.

In the reactor, and according to embodiments, the ethylene conversion is greater than or equal to 20% and less than or equal to 40%, such as greater than or equal to 25% and less than or equal to 35%, or about 30%.

The polymerized stream 131 is introduced into HPS 140 that is sequentially connected to the reactor 130, which is upstream of the HPS 140, and sequentially connected to a low pressure separator (LPS) 150. At the HPS 140, the polymerized stream 131 is separated into an ethylene rich stream 141 and a polymer rich stream 142. The ethylene rich stream 141 is cooled and recycled back to the hypercompressor 120, where the ethylene rich stream 141 is mixed with the compressed stream 11 that is introduced to the hypercompressor 120.

The polymer rich stream 142 is introduced to LPS 150 that is sequentially connected to the HPS 140, which is upstream of the LPS, and is sequentially connected to the booster 160, which is downstream of the LPS. At the LPS, the polymer rich stream is separated into a second polymer rich stream 152 and a second ethylene rich stream 151. The second polymer rich stream 152 exits the process system where it may be pelletized or otherwise finished for end use.

The second ethylene rich stream 151 is introduced to booster 160 that is sequentially connected to the LPS, which is upstream of booster 160, and is sequentially connected to the primary compressor 110, which is downstream of the booster 160. At booster 160, the second ethylene rich stream 151 is conditioned and the resulting conditioned stream 161 is mixed with the CTA 102 and the fresh ethylene feed line 101. Inerts may be purged from the mixture of the conditioned stream 161 and the CTA 102 as purge stream 103.

The CTA can, in embodiments, be used to control molecular weight. In embodiments, one or more CTAs are added to the polymerization process. CTA's that can be used include, according to embodiments, propylene, isobutane, n-butane, 1-butene, methyl ethyl ketone, acetone, and propionaldehyde In embodiments, the ethylene-based polymer produced as stream 152 is a polyethylene homopolymer.

LDPE Properties of Embodiments

It was discovered that by performing processes as described above, LDPE with high molecular weights and good melt strength can be produced. Properties of LDPE according to embodiments disclosed and described herein will now be provided. It should be understood that by modifying the various process conditions described above LDPE with differing and desirable properties can be produced. Although the properties listed below are recited in separate paragraphs, it should be understood that any property from any paragraph below may be combined with any other property from any paragraph below by modifying the various process conditions discussed above. Therefore, LDPE having any combination of various properties listed below are envisioned and can be produced according to embodiments.

According to embodiments, the ethylene-based polymer may have a density of greater than or equal to 0.915 and less than or equal to 0.935 grams per cubic centimeter (g/cc). Density measurements were made within one hour of sample pressing using ASTM D792-08, Method B. In embodiments, the ethylene-based polymer has a density of greater than or equal to 0.915 g/cc and less than or equal to 0.925 g/cc, greater than or equal to 0.917 g/cc and less than or equal to 0.923 g/cc, such as about 0.920 g/cc.

In embodiments, the ethylene-based polymer has a melt index ($I_2$)—measured according to ASTM D 1238 at 190° C. and at a load of 2.16 kg—that is less than or equal to 0.30 grams per 10 minutes (g/10 min), such as less than or equal to 0.28 g/10 min, less than or equal to 0.26 g/10 min, less than or equal to 0.24 g/10 min, less than or equal to 0.22 g/10 min, less than or equal to 0.20 g/10 min, less than or equal to 0.18 g/10 min, less than or equal to 0.16 g/10 min, less than or equal to 0.14 g/10 min, or less than or equal to 0.12 g/10 min. In embodiments, the melt index ($I_2$) is greater than or equal to 0.10 g/10 min, such as greater than or equal to 0.12 g/10 min, greater than or equal to 0.14 g/10 min, greater than or equal to 0.16 g/10 min, greater than or equal to 0.18 g/10 min, greater than or equal to 0.20 g/10 min, greater than or equal to 0.22 g/10 min, greater than or equal to 0.24 g/10 min, greater than or equal to 0.26 g/10 min, or greater than or equal to 0.28 g/10 min. In embodiments the melt index ($I_2$) is greater than or equal to 0.10 g/10 min and less than or equal to 0.30 g/10 min, such as greater than or equal to 0.12 g/10 min and less than or equal to 0.30 g/10 min, greater than or equal to 0.14 g/10 min and less than or equal to 0.30 g/10 min, greater than or equal to 0.16 g/10 min and less than or equal to 0.30 g/10 min, greater than or equal to 0.18 g/10 min and less than or equal to 0.30 g/10 min, greater than or equal to 0.20 g/10 min and less than or equal to 0.30 g/10 min, greater than or equal to 0.22 g/10 min and less than or equal to 0.30 g/10 min, greater than or equal to 0.24 g/10 min and less than or equal to 0.30 g/10 min, greater than or equal to 0.26 g/10 min and less than or equal to 0.30 g/10 min, or greater than or equal to 0.28 g/10 min and less than or equal to 0.30 g/10 min. In embodiments, the melt index ($I_2$) is greater than or equal to 0.10 and less than or equal to 0.30, such as greater than or equal to 0.10 and less than or equal to 0.20, or about 0.15. According to one or more embodiments, the melt index ($I_2$) is greater than or equal to 0.05 g/10 min, such as greater than or equal to 0.06 g/10 min, greater than or equal to 0.07 g/10 min, greater than or equal to 0.08 g/10 min, or greater than or equal to 0.09 g/10 min. In embodiments, the melt index ($I_2$) is greater than or equal to 0.05 g/10 min and less than or equal to 0.30 g/10 min, such as greater than or equal to 0.05 g/10 min and less than or equal to 0.25 g/10 min, greater than or equal to 0.05 g/10 min and less than or equal to 0.20 g/10 min, greater than or equal to 0.05 g/10 min and less than or equal to 0.15 g/10 min, or greater than or equal to 0.05 g/10 min and less than or equal to 0.10 g/10 min.

The peak melt strength was measured using a Rheotens attached to a capillary rheometer as disclosed below. In embodiments, the peak melt strength is greater than or equal to 20 centiNewtons (cN), such as greater than or equal to 22 cN, greater than or equal to 24 cN, greater than or equal to 26 cN, greater than or equal to 28 cN, greater than or equal to 30 cN, greater than or equal to 32 cN, greater than or equal to 34 cN, greater than or equal to 36 cN, greater than or equal to 38 cN, greater than or equal to 40 cN, greater than or equal to 42 cN, greater than or equal to 44 cN, greater than or equal to 46 cN, or greater than or equal to 48 cN. In embodiments, the melt strength is greater than or equal to 20 cN and less than or equal to 50 cN, such as greater than or equal to 22 cN and less than or equal to 50 cN, greater than or equal to 24 cN and less than or equal to 50 cN, greater than or equal to 26 cN and less than or equal to 50 cN, greater than or equal to 28 cN and less than or equal to 50 cN, greater than or equal to 30 cN and less than or equal to 50 cN, greater than or equal to 32 cN and less than or equal to 50 cN, greater than or equal to 34 cN and less than or equal to 50 cN, greater than or equal to 36 cN and less than or equal to 50 cN, greater than or equal to 38 cN and less than or equal to 50 cN, greater than or equal to 40 cN and less than or equal to 50 cN, greater than or equal to 42 cN and less than or equal to 50 cN, greater than or equal to 44 cN and less than or equal to 50 cN, greater than or equal to 46 cN and less than or equal to 50 cN, or greater than or equal to 48 cN and less than or equal to 50 cN. In embodiments, the melt strength is greater than or equal to 20 cN and less than or equal to 48 cN, such as greater than or equal to 20 cN and less than or equal to 46 cN, greater than or equal to 20 cN and less than or equal to 44 cN, greater than or equal to 20 cN and less than or equal to 42 cN, greater than or equal to 20 cN and less than or equal to 40 cN, greater than or equal to 20 cN and less than or equal to 38 cN, greater than or equal to 20 cN and less than or equal to 36 cN, greater than or equal to 20 cN and less than or equal to 34 cN, greater than or equal to 20 cN and less than or equal to 32 cN, greater than or equal to 20 cN and less than or equal to 30 cN, greater than or equal to 20 cN and less than or equal to 28 cN, greater than or equal to 20 cN and less than or equal to 26 cN, greater than or equal to 20 cN and less than or equal to 24 cN, or greater than or equal to 20 cN and less than or equal to 22 cN. In embodiments, the peak melt strength is greater than or equal to 22 cN and less than or equal to 48 cN, such as greater than or equal to 24 cN and less than or equal to 46 cN, greater than or equal to 26 cN and less than or equal to 44 cN, greater than or equal to 28 cN and less than or equal to 42 cN, greater than or equal to 30 cN and less than or equal to 40 cN, greater than or equal to 32 cN and less than or equal to 38 cN, or greater than or equal to 34 cN and less than or equal to 36 cN. In embodiments, the LDPE has a peak melt strength (MS) greater than or equal to 20 and less than or equal to 50 cN, such as greater than or equal to 20 and less than or equal to 40 cN, greater than or equal to 20 and less than or equal to 35 cN, or greater than or equal to 22 and less than or equal to 30 cN. In embodiments, the ethylene-based polymer is a LDPE.

According to embodiments, the extractables of the LDPE using a hexane method is less than or equal to 3.00 weight percent (wt %), such as less than or equal to 2.75 wt %, less than or equal to 2.50 wt %, less than or equal to 2.25 wt %, less than or equal to 2.00 wt %, less than or equal to 1.75 wt %, less than or equal to 1.50 wt %, less than or equal to 1.25 wt %, less than or equal to 1.00 wt %, less than or equal to 0.75 wt %, less than or equal to 0.50 wt %, or less than or equal to 0.25 wt %. In embodiments, the extractables of the LDPE using a hexane method is greater than or equal to 0.10 wt % and less than or equal to 3.00 wt %, such as greater than or equal to 0.10 wt % and less than or equal to 2.75 wt %, greater than or equal to 0.10 wt % and less than or equal to 2.50 wt %, greater than or equal to 0.10 wt % and less than or equal to 2.25 wt %, greater than or equal to 0.10 wt % and less than or equal to 2.00 wt %, greater than or equal to 0.10 wt % and less than or equal to 1.75 wt %, greater than or equal to 0.10 wt % and less than or equal to 1.50 wt %, greater than or equal to 0.10 wt % and less than or equal to 1.25 wt %, greater than or equal to 0.10 wt % and less than or equal to 1.00 wt %, greater than or equal to 0.10 wt % and less than or equal to 0.75 wt %, greater than or equal to 0.10 wt % and less than or equal to 0.50 wt %, or greater than or equal to 0.10 wt % and less than or equal to 0.25 wt %. In embodiments, the extractables of the LDPE using a hexane method is greater than or equal to 0.25 wt % and less than or equal to 3.00 wt %, such as greater than or equal to 0.50 wt % and less than or equal to 3.00 wt %, greater than or equal to 0.75 wt % and less than or equal to 3.00 wt %, greater than or equal to 1.00 wt % and less than or equal to 3.00 wt %, greater than or equal to 1.25 wt % and less than or equal to 3.00 wt %, greater than or equal to 1.50 wt % and less than or equal to 3.00 wt %, greater than or equal to 1.75 wt % and less than or equal to 3.00 wt %, greater than or equal to 2.00 wt % and less than or equal to 3.00 wt %, greater than or equal to 2.25 wt % and less than or equal to 3.00 wt %, greater than or equal to 2.50 wt % and less than or equal to 3.00 wt %, or greater than or equal to 2.75 wt % and less than or equal to 3.00 wt %. In embodiments the extractables of the LDPE suing a hexane method is greater than or equal to 0.25 wt % and less than or equal to 2.75 wt %, such as greater than or equal to 0.50 wt % and less than or equal to 2.50 wt %, greater than or equal to 0.75 wt % and less than or equal to 2.25 wt %, greater than or equal to 1.00 wt % and less than or equal to 2.00 wt %, greater than or equal to 1.25 wt % and less than or equal to 1.75 wt % or about 1.50 wt %. The extractables of the LDPE is measured according to the hexane test method described herein. In embodiments, the LDPE has a hexane extractables of greater than or equal to 1.00 and less than or equal to 2.00 wt %, such as greater than or equal to 1.20 and less than or equal to 1.80 wt %, greater than or equal to 1.30 and less than or equal to 1.60 wt %, or greater than or equal to 1.40 and less than or equal to 1.60 wt %.

The number average molecular weight (Mn(conv))—measured by conventional GPC methods—of the LDPE is, according to embodiments, greater than or equal to 12,000 grams per mole (g/mol) and less than or equal to 22,000 g/mol, such as greater than or equal to 12,500 g/mol and less than or equal to 21,500 g/mol, greater than or equal to 13,000 g/mol and less than or equal to 21,000 g/mol, greater than or equal to 13,500 g/mol and less than or equal to 20,500 g/mol, greater than or equal to 14,000 g/mol and less than or equal to 20,000 g/mol, greater than or equal to 14,500 g/mol and less than or equal to 19,500 g/mol, greater than or equal to 15,000 g/mol and less than or equal to 19,000 g/mol, greater than or equal to 15,500 g/mol and less than or equal to 18,500 g/mol, greater than or equal to 16,000 g/mol and less than or equal to 18,000 g/mol, greater than or equal to 16,500 g/mol and less than or equal to 17,500 g/mol, or about 17,000 g/mol. The Mn(conv) is measured according to the gel permeation chromatography (GPC) protocols (conventional) disclosed herein. In embodiments, the LDPE has a number average molecular weight by conventional methods greater than or equal to 12,000 g/mol and less than or equal to 22,000 g/mol, such as greater than or equal to 14,000 and less than or equal to 20,000 g/mol, greater than or equal to 15,000 and less than or equal to 19,000 g/mol, or greater than or equal to 15,500 and less than or equal to 18,500 g/mol.

The mass average molecular weight (Mw (conv))—measured by conventional GPC methods—of the LDPE is, according to embodiments, greater than or equal to 120,000 g/mol and less than or equal to 200,000 g/mol, such as greater than or equal to 122,000 g/mol and less than or equal to 198,000 g/mol, greater than or equal to 124,000 g/mol and less than or equal to 196,000 g/mol, greater than or equal to 126,000 g/mol and less than or equal to 194,000 g/mol, greater than or equal to 128,000 g/mol and less than or equal to 192,000 g/mol, greater than or equal to 130,000 g/mol and less than or equal to 190,000 g/mol, greater than or equal to 132,000 g/mol and less than or equal to 188,000 g/mol, greater than or equal to 134,000 g/mol and less than or equal to 186,000 g/mol, greater than or equal to 136,000 g/mol and less than or equal to 184,000 g/mol, greater than or equal to 138,000 g/mol and less than or equal to 182,000 g/mol, greater than or equal to 140,000 g/mol and less than or equal to 180,000 g/mol, greater than or equal to 142,000 g/mol and less than or equal to 178,000 g/mol, greater than or equal to 144,000 g/mol and less than or equal to 176,000 g/mol, greater than or equal to 146,000 g/mol and less than or equal to 174,000 g/mol, greater than or equal to 148,000 g/mol and less than or equal to 172,000 g/mol, greater than or equal to 150,000 g/mol and less than or equal to 170,000 g/mol, greater than or equal to 152,000 g/mol and less than or equal to 168,000 g/mol, greater than or equal to 154,000 g/mol and less than or equal to 166,000 g/mol, greater than or equal to 156,000 g/mol and less than or equal to 164,000 g/mol, greater than or equal to 158,000 g/mol and less than or equal to 162,000 g/mol, or about 160,000 g/mol. The Mw (cony) is measured according to the conventional GPC protocols disclosed herein. In embodiments, the LDPE has a weight average molecular weight by conventional GPC methods greater than or equal to 145,000 g/mol and less than or equal to 160,000 g/mol, such as greater than 147,000 g/mol and less than or equal to 160,000 g/mol, greater than or equal to 149,000 g/mol and less than or equal to 158,000 g/mol, of greater than or equal to 150,000 g/mol and less than or equal to 157,000 g/mol.

The z-average molecular weight (Mz(conv))—measured by conventional GPC methods—of the LDPE is, according to embodiments, greater than or equal to 425,000 g/mol and less than or equal to 800,000 g/mol, such as greater than or equal to 440,000 g/mol and less than or equal to 780,000 g/mol, greater than or equal to 460,000 g/mol and less than or equal to 760,000 g/mol, greater than or equal to 480,000 g/mol and less than or equal to 740,000 g/mol, greater than or equal to 500,000 g/mol and less than or equal to 720,000 g/mol, greater than or equal to 520,000 g/mol and less than or equal to 700,000 g/mol, greater than or equal to 540,000 g/mol and less than or equal to 680,000 g/mol, greater than or equal to 560,000 g/mol and less than or equal to 660,000 g/mol, greater than or equal to 580,000 g/mol and less than or equal to 640,000 g/mol, or greater than or equal to 600,000 g/mol and less than or equal to 620,000 g/mol. The Mz (cony) is measured according to the conventional GPC protocols disclosed herein. In embodiments, the LDPE has a z-average molecular weight by conventional GPC methods greater than or equal to 425,000 g/mol and less than or equal to 800,000 g/mol, such as greater than or equal to 500,000 g/mol and less than or equal to 750,000 g/mol, greater than or equal to 550,000 g/mol and less than or equal to 750,000 g/mol, or greater than or equal to 675,000 g/mol and less than or equal to 725,000 g/mol.

In embodiments, the ratio of Mw to Mn (Mw(conv)/Mn (conv))—measured according to conventional GPC methods—of the LDPE is greater than or equal to 7.0, such as greater than or equal to 7.4, greater than or equal to 7.8, greater than or equal to 8.0, greater than or equal to 8.4, greater than or equal to 8.8, greater than or equal to 9.0, greater than or equal to 9.4, greater than or equal to 9.8, greater than or equal to 10.0, greater than or equal to 10.4, or greater than or equal to 10.8. In embodiments, Mw (conv)/Mn (cony) is less than or equal to 11.0, such as less than or equal to 10.6, less than or equal to 10.2, less than or equal to 10.0, less than or equal to 9.6, less than or equal to 9.2, less than or equal to 9.0, less than or equal to 8.6, or less than or equal to 8.4, less than or equal to 8.0, less than or equal to 7.6, or less than or equal to 7.2. In embodiments, the ratio of Mw to Mn is greater than or equal to 7.0 and less than or equal to 11.0, such as greater than or equal to 7.4 and less than or equal to 11.0, greater than or equal to 7.8 and less than or equal to 11.0, greater than or equal to 8.0 and less than or equal to 11.0, greater than or equal to 8.4 and less than or equal to 11.0, greater than or equal to 8.8 and less than or equal to 11.0, greater than or equal to 9.0 and less than or equal to 11.0, greater than or equal to 9.4 and less than or equal to 11.0, greater than or equal to 9.8 and less than or equal to 11.0, greater than or equal to 10.0 and less than or equal to 11.0, greater than or equal to 10.4 and less than or equal to 11.0, or greater than or equal to 10.8 and less than or equal to 11.0. In embodiments, Mw (conv)/Mn (cony) is greater than or equal to 7.0 and less than or equal to 10.6, such as greater than or equal to 7.0 and less than or equal to 10.2, greater than or equal to 7.0 and less than or equal to 10.0, greater than or equal to 7.0 and less than or equal to 9.6, greater than or equal to 7.0 and less than or equal to 9.2, greater than or equal to 7.0 and less than or equal to 9.0, greater than or equal to 7.0 and less than or equal to 8.6, greater than or equal to 7.0 and less than or equal to 8.2, greater than or equal to 7.0 and less than or equal to 8.0, greater than or equal to 7.0 and less than or equal to 7.6, or greater than or equal to 7.0 and less than or equal to 7.2. In embodiments, the ratio of Mw to Mn is greater than or equal to 7.4 and less than or equal to 10.6, such as greater than or equal to 7.8 and less than or equal to 10.2, greater than or equal to 8.0 and less than or equal to 10.0, greater than or equal to 8.4 and less than or equal to 9.6, or greater than or equal to 8.8 and less than or equal to 9.2. In embodiments, the LDPE has a Mw (conv)/Mn (cony) by conventional GPC methods greater than or equal to 7.0 and less than or equal to 11.0, such as greater than or equal to 7.5 and less than or equal to 10.5, greater than or equal to 8.0 and less than or equal to 10.0, or greater than or equal to 8.2 and less than or equal to 9.8.

The weight average molecular weight Mw (abs)—measured according to absolute methods provided below—of the LDPE is, according to embodiments, greater than or equal to 300,000 g/mol and less than or equal to 500,000 g/mol, greater than or equal to 305,000 g/mol and less than or equal to 495,000 g/mol, greater than or equal to 310,000 g/mol and less than or equal to 490,000 g/mol, greater than or equal to 315,000 g/mol and less than or equal to 485,000 g/mol, greater than or equal to 320,000 g/mol and less than or equal to 480,000 g/mol, greater than or equal to 325,000 g/mol and less than or equal to 475,000 g/mol, greater than or equal to 330,000 g/mol and less than or equal to 470,000 g/mol, greater than or equal to 335,000 g/mol and less than or equal to 465,000 g/mol, greater than or equal to 340,000 g/mol and less than or equal to 460,000 g/mol, greater than or equal to 345,000 g/mol and less than or equal to 455,000 g/mol, greater than or equal to 350,000 g/mol and less than or equal to 450,000 g/mol, greater than or equal to 355,000 g/mol and less than or equal to 445,000 g/mol, greater than or equal to 360,000 g/mol and less than or equal to 440,000 g/mol, greater than or equal to 365,000 g/mol and less than or equal to 435,000 g/mol, greater than or equal to 370,000 g/mol and less than or equal to 430,000 g/mol, greater than or equal to 375,000 g/mol and less than or equal to 425,000 g/mol, greater than or equal to 400,000 g/mol and less than or equal to 420,000 g/mol, greater than or equal to 405,000 g/mol and less than or equal to 415,000 g/mol, or about 410,000 g/mol. The Mw (abs) is measured according to the absolute GPC protocols disclosed herein. In embodiments, the LDPE has weight average molecular weight by absolute methods greater than or equal to 300,000 g/mol and less than or equal to 500,000 g/mol, such as greater than or equal to 300,000 g/mol and less than or equal to 490,000 g/mol, greater than or equal to 325,000 g/mol and less than or equal to 490,000 g/mol, or greater than or equal to 347,000 g/mol and less than or equal to 450,000 g/mol.

The ratio of weight average molecular weight measured according to absolute methods to weight average molecular weight measured according to conventional GPC methods (Mw (abs)/Mw (cony)) disclosed herein of the LDPE is, according to embodiments, greater than or equal to 2.00 and less than or equal to 2.80, such as less than or equal to 2.10 to 2.80, greater than or equal to 2.20 and less than or equal to 2.80, greater than or equal to 2.30 and less than or equal to 2.80, greater than or equal to 2.40 and less than or equal to 2.80, or greater than or equal to 2.50 and less than or equal to 2.80. In embodiments the ratio of Mw (abs)/Mw (cony) is greater than or equal to 2.00 and less than or equal to 2.70, such as greater than or equal to 2.00 and less than or equal to 2.60, greater than or equal to 2.00 and less than or equal to 2.50, greater than or equal to 2.00 and less than or equal to 2.40, greater than or equal to 2.00 and less than or equal to 2.30, greater than or equal to 2.00 and less than or equal to 2.20, or greater than or equal to 2.00 and less than or equal to 2.10. In embodiments the ratio of Mw (abs)/Mw (cony) is greater than or equal to 2.10 and less than or equal to 2.70, greater than or equal to 2.20 and less than or equal to 2.60, greater than or equal to 2.30 and less than or equal to 2.50, or about 2.40. In embodiments, the LDPE has a Mw(abs)/Mw(conv) greater than or equal to 2.00 and less than or equal to 2.80, greater than or equal to 2.20 and less than or equal to 2.60, greater than or equal to 2.30 and less than or equal to 2.60, or greater than or equal to 2.30 and less than or equal to 2.50.

According to embodiments, the GPC branching ratio (gpcBR) of the LDPE—measured with the absolute techniques disclosed herein—is greater than or equal to 2.00 and less than or equal to 3.10, such as greater than or equal to 2.10 and less than or equal to 3.10, greater than or equal to 2.20 and less than or equal to 3.10, greater than or equal to 2.30 and less than or equal to 3.10, greater than or equal to 2.40 and less than or equal to 3.10, greater than or equal to 2.50 and less than or equal to 3.10, greater than or equal to 2.60 and less than or equal to 3.10, greater than or equal to 2.70 and less than or equal to 3.10, greater than or equal to 2.80 and less than or equal to 3.10, or greater than or equal to 2.90 and less than or equal to 3.10. In embodiments, the gpcBR is greater than or equal to 2.00 and less than or equal to 2.90, such as greater than or equal to 2.00 and less than or equal to 2.80, greater than or equal to 2.00 and less than or equal to 2.70, greater than or equal to 2.00 and less than or equal to 2.60, greater than or equal to 2.00 and less than or equal to 2.50, greater than or equal to 2.00 and less than or equal to 2.40, greater than or equal to 2.00 and less than or equal to 2.30, greater than or equal to 2.00 and less than or equal to 2.20, or greater than or equal to 2.00 and less than or equal to 2.1. In embodiments, the gpcBR is greater than or equal to 2.10 and less than or equal to 3.00, such as greater than or equal to 2.20 and less than or equal to 2.90, greater than or equal to 2.30 and less than or equal to 2.80, greater than or equal to 2.40 and less than or equal to 2.70, or greater than or equal to 2.50 and less than or equal to 2.60. In embodiments, the LDPE has a gpcBR of greater than or equal to 2.0 and less than or equal to 3.1, greater than or equal to 2.2 and less than or equal to 2.9, greater than or equal to 2.4 and less than or equal to 2.7, or greater than or equal to 2.5 and less than or equal to 2.65.

The long chain branching frequency ($LCB_f$) refers to the level of long chain branches per 1000 carbons. In embodiments, the LCB of the final product ($LCB_f$) is greater than or equal to 1.4 and less than or equal to 2.3, such as greater than or equal to 1.5 and less than or equal to 2.3, greater than or equal to 1.6 and less than or equal to 2.3, greater than or equal to 1.7 and less than or equal to 2.3, greater than or equal to 1.8 and less than or equal to 2.3, greater than or equal to 1.9 and less than or equal to 2.3, greater than or equal to 2.0 and less than or equal to 2.3, greater than or equal to 2.1 and less than or equal to 2.3, or greater than or equal to 2.2 and less than or equal to 2.3. In embodiments, the $LCB_f$ is greater than or equal to 1.4 and less than or equal to 2.2, such as greater than or equal to 1.4 and less than or equal to 2.1, greater than or equal to 1.5 and less than or equal to 2.0, greater than or equal to 1.4 and less than or equal to 1.9, greater than or equal to 1.4 and less than or equal to 1.8, greater than or equal to 1.4 and less than or equal to 1.7, greater than or equal to 1.4 and less than or equal to 1.6, or greater than or equal to 1.4 and less than or equal to 1.5. In embodiments, the $LCB_f$ is greater than or equal to 1.7 and less than or equal to 2.0. In embodiments, the LDPE has a $LCB_f$ greater than or equal to 1.4 and less than or equal to 2.3, such as greater than or equal to 1.5 and less than or equal to 2.2, greater than or equal to 1.6 and less than or equal to 2.1, or greater than or equal to 1.7 and less than or equal to 2.0.

The light scattering property (LSP) of the LDPE is, according to embodiments, less than 2.00, such as less than or equal to 1.90, less than or equal to 1.80, less than or equal to 1.70, less than or equal to 1.60, less than or equal to 1.50, less than or equal to 1.40, less than or equal to 1.30, less than or equal to 1.20, less than or equal to 1.10, less than or equal to 1.00, or less than or equal to 0.90. In embodiments, the LSP is greater than or equal to 1.00, greater than or equal to 1.10, greater than or equal to 1.20, greater than or equal to 1.30, greater than or equal to 1.40, greater than or equal to 1.50, greater than or equal to 1.60, greater than or equal to 1.70, greater than or equal to 1.80, or greater than or equal to 1.90. In embodiments, the LSP is greater than or equal to 0.80 and less than or equal to 2.00, such as greater than or equal to 0.90 and less than or equal to 1.90, greater than or equal to 1.00 and less than or equal to 1.80, greater than or equal to 1.10 and less than or equal to 1.70, greater than or equal to 1.20 and less than or equal to 1.60, and greater than or equal to 1.30 and less than or equal to 1.50. In embodiments, the LSP is greater than or equal to 1.20 and less than or equal to 1.60, or greater than or equal to 1.20 and less than or equal to 1.70. In embodiments, the LDPE has a LSP greater than or equal to 0.8 and less than or equal to 2.0, such as greater than or equal to 0.9 and less than or equal to 1.9, greater than or equal to 1.0 and less than or equal to 1.8, or greater than or equal to 1.1 and less than or equal to 1.7.

In embodiments, the LDPE has a viscosity measured at 0.1 radians/second (rad/sec) and 190° C. is greater than or equal to 35,000 Pa·s and less than or equal to 50,000 Pa·s, such as greater than or equal to 36,000 Pa·s and less than or equal to 50,000 Pa·s, greater than or equal to 37,000 Pa·s and less than or equal to 50,000 Pa·s, greater than or equal to 38,000 Pa·s and less than or equal to 50,000 Pa·s, greater than or equal to 39,000 Pa·s and less than or equal to 50,000 Pa·s, greater than or equal to 40,000 Pa·s and less than or equal to 50,000 Pa·s, greater than or equal to 41,000 Pa·s and less than or equal to 50,000 Pa·s, greater than or equal to 42,000 Pa·s and less than or equal to 50,000 Pa·s, greater than or equal to 43,000 Pa·s and less than or equal to 50,000 Pa·s, greater than or equal to 44,000 Pa·s and less than or equal to 50,000 Pa·s, greater than or equal to 45,000 Pa·s and less than or equal to 50,000 Pa·s, greater than or equal to 46,000 Pa·s and less than or equal to 50,000 Pa·s, greater than or equal to 47,000 Pa·s and less than or equal to 50,000 Pa·s, greater than or equal to 48,000 Pa·s and less than or equal to 50,000 Pa·s, or greater than or equal to 49,000 Pa·s and less than or equal to 50,000 Pa·s. In embodiments, the viscosity measured at 0.1 radians/second and 190° C. is greater than or equal to 35,000 Pa·s and less than or equal to 49,000 Pa·s, greater than or equal to 35,000 Pa·s and less than or equal to 48,000 Pa·s, greater than or equal to 35,000 Pa·s and less than or equal to 47,000 Pa·s, greater than or equal to 35,000 Pa·s and less than or equal to 46,000 Pa·s, greater than or equal to 35,000 Pa·s and less than or equal to 45,000 Pa·s, greater than or equal to 35,000 Pa·s and less than or equal to 44,000 Pa·s, greater than or equal to 35,000 Pa·s and less than or equal to 43,000 Pa·s, greater than or equal to 35,000 Pa·s and less than or equal to 42,000 Pa·s, greater than or equal to 35,000 Pa·s and less than or equal to 41,000 Pa·s, greater than or equal to 35,000 Pa·s and less than or equal to 40,000 Pa·s, greater than or equal to 35,000 Pa·s and less than or equal to 39,000 Pa·s, greater than or equal to 35,000 Pa·s and less than or equal to 38,000 Pa·s, greater than or equal to 35,000 Pa·s and less than or equal to 37,000 Pa·s, or greater than or equal to 35,000 Pa·s and less than or equal to 36,000 Pa·s. The viscosity is measured according the protocols disclosed herein. In embodiments, the LDPE has a viscosity measured at 0.1 radians/second and 190° C. greater than or equal to 35,000 Pa·s and less than or equal to 50,000 Pa·s, such as greater than or equal to 35,000 Pa·s and less than or equal to 49,000 Pa·s, greater than or equal to 36,000 Pa·s and less than or equal to 48,000 Pa·s, or greater than or equal to 37,000 Pa·s and less than or equal to 47,000 Pa·s.

In embodiments, the LDPE has a viscosity measured at 100 radians/second (rad/sec) and 190° C. is greater than or equal to 300 Pa·s and less than or equal to 1,300 Pa·s, such as greater than or equal to 350 Pa·s and less than or equal to 1,250 Pa·s, greater than or equal to 400 Pa·s and less than or equal to 1,200 Pa·s, greater than or equal to 450 Pa·s and less than or equal to 1,150 Pa·s, greater than or equal to 500 Pa·s and less than or equal to 1,100 Pa·s, greater than or equal to 550 Pa·s and less than or equal to 1,050 Pa·s, greater than or equal to 600 Pa·s and less than or equal to 1,000 Pa·s, greater than or equal to 650 Pa·s and less than or equal to 950 Pa·s, greater than or equal to 700 Pa·s and less than or equal to 900 Pa·s, greater than or equal to 750 Pa·s and less than or equal to 850 Pa·s, or about 800 Pa·s. The viscosity is measured according the protocols disclosed herein. In embodiments, the LDPE has a viscosity measured at 100 rad/s and 190° C. greater than or equal to 300 Pa·s and less than or equal to 1300 Pa·s, such as greater than or equal to 400 Pa·s and less than or equal to 1200 Pa·s, greater than or equal to 500 Pa·s and less than or equal to 1100 Pa·s, or greater than or equal to 600 Pa·s and less than or equal to 1000 Pa·s.

In embodiments, the LDPE has a ratio of viscosity measured at 0.1 radians/second and 190° C. to viscosity measured at 100 radians/second and 190° C. (V@0.1/V@100 and 190° C.) is greater than or equal to 40.0, such as greater than or equal to 42.0, greater than or equal to 44.0, greater than or equal to 46.0, greater than or equal to 48.0 greater than or equal to 50.0, greater than or equal to 52.0, greater than or equal to 54.0, greater than or equal to 56.0, greater than or equal to 58.0, greater than or equal to 60.0, greater than or equal to 62.0, or greater than or equal to 64.0. In embodiments, a ratio of viscosity measured at 0.1 radians/second and 190° C. to viscosity measured at 100 radians/second and 190° C. is greater than or equal to 40.0 and less than or equal to 65.0, such as greater than or equal to 42.0 and less than or equal to 65.0, greater than or equal to 44.0 and less than or equal to 65.0, greater than or equal to 46.0 and less than or equal to 65.0, greater than or equal to 48.0 and less than or equal to 65.0, greater than or equal to 50.0 and less than or equal to 65.0, greater than or equal to 52.0 and less than or equal to 65.0, greater than or equal to 54.0 and less than or equal to 65.0, greater than or equal to 56.0 and less than or equal to 65.0, greater than or equal to 58.0 and less than or equal to 65.0, greater than or equal to 60.0 and less than or equal to 65.0, greater than or equal to 62.0 and less than or equal to 65.0, or greater than or equal to 64.0 and less than or equal to 65.0. In embodiments, the ratio of viscosity measured at 0.1 radians/second and 190° C. to viscosity measured at 100 radians/second and 190° C. is greater than or equal to 40.0 and less than or equal to 64.0, such as greater than or equal to 40.0 and less than or equal to 62.0, greater than or equal to 40.0 and less than or equal to 60.0, greater than or equal to 40.0 and less than or equal to 58.0, greater than or equal to 40.0 and less than or equal to 56.0, greater than or equal to 40.0 and less than or equal to 54.0, greater than or equal to 40.0 and less than or equal to 52.0, greater than or equal to 40.0 and less than or equal to 50.0, greater than or equal to 40.0 and less than or equal to 48.0, greater than or equal to 40.0 and less than or equal to 46.0, greater than or equal to 40.0 and less than or equal to 44.0, or greater than or equal to 40.0 and less than or equal to 42.0. In embodiments, the ratio of viscosity measured at 0.1 radians/second and 190° C. to viscosity measured at 100 radians/second and 190° C. is greater than or equal to 42.0 and less than or equal to 62.0, such as greater than or equal to 44.0 and less than or equal to 60.0, greater than or equal to 46.0 and less than or equal to 58.0, greater than or equal to 48.0 and less than or equal to 56.0, or greater than or equal to 50.0 and less than or equal to 54.0. In embodiments, the LDPE has a ratio of viscosity measured at 0.1 rad/s and 190° C. to viscosity measured at 100 rad/s at 190° C. greater than or equal to 40 and less than or equal to 65, such as greater than or equal to 44 and less than or equal to 61, greater than or equal to 48 and less than or equal to 57, or greater than or equal to 49 and less than or equal to 57.

In embodiments, the cumulative distribution fraction (CDF) for infrared spectrum analysis ($CDF_{IR}$) at a molecular weight less than 10,000 g/mol is greater than or equal to 0.110, such as greater than or equal to 0.115, greater than or equal to 0.120, greater than or equal to 0.125, greater than or equal to 0.130, greater than or equal to 0.135, greater than or equal to 0.140, greater than or equal to 0.145, or greater than or equal to 0.150. In embodiments, the $CDF_{IR}$ at a molecular weight less than 10,000 g/mol is greater than or equal to 0.110 and less than or equal to 0.160, such as greater than or equal to 0.115 and less than or equal to 0.155, greater than or equal to 0.120 and less than or equal to 0.150, greater than or equal to 0.125 and less than or equal to 0.145, or greater than or equal to 0.130 and less than or equal to 0.140. In embodiment, the LDPE has a $CDF_{IR}$ at a molecular weight less than 10,000 g/mol greater than or equal to 0.110 and less than or equal to 0.160, such as greater than or equal to 0.115 and less than or equal to 0.155, greater than or equal to 0.120 and less than or equal to 0.15, or greater than or equal to 0.125 and less than or equal to 0.145.

In embodiments, the $CDF_{IR}$ at a molecular weight greater than 500,000 g/mol is greater than or equal to 0.400, such as greater than or equal to 0.450, greater than or equal to 0.500, greater than or equal to 0.550, greater than or equal to 0.600, greater than or equal to 0.650, greater than or equal to 0.700, greater than or equal to 0.750, greater than or equal to 0.800, or greater than or equal to 0.850. In embodiments, the $CDF_{IR}$ at a molecular weight greater than 500,000 g/mol is greater than or equal to 0.400 and less than or equal to 0.900, such as greater than or equal to 0.450 and less than or equal to 0.850, greater than or equal to 0.500 and less than or equal to 0.800, greater than or equal to 0.550 and less than or equal to 0.750, or greater than or equal to 0.600 and less than or equal to 0.700. In embodiments, the LDPE has a $CDF_{IR}$ at a molecular weight greater than 500,000 g/mol greater than or equal to 0.4 and less than or equal to 0.9, such as greater than or equal to 0.45 and less than or equal to 0.85, greater than or equal to 0.5 and less than or equal to 0.8, or greater than or equal to 0.55 and less than or equal to 0.75.

In embodiments, the CDF for viscometer analysis ($CDF_{DV}$) at a molecular weight less than 50,000 g/mol is less than or equal to 0.180, such as less than or equal to 0.175, less than or equal to 0.170, less than or equal to 0.165, less than or equal to 0.160, less than or equal to 0.155, less than or equal to 0.150, less than or equal to 0.145, less than or equal to 0.140, or less than or equal to 0.135. In embodiments, the $CDF_{DV}$ at a molecular weight less than 50,000 g/mol is greater than or equal to 0.130 and less than or equal to 0.180, such as greater than or equal to 0.135 and less than or equal to 0.175, greater than or equal to 0.140 and less than or equal to 0.170, greater than or equal to 0.145 and less than or equal to 0.165, or greater than or equal to 0.150 and less than or equal to 0.160. In embodiments, the LDPE has a $CDF_{DV}$ at a molecular weight less than 50,000 g/mol greater than or equal to 0.13 and less than or equal to 0.18, such as greater than or equal to 0.135 and less than or equal to 0.155, greater than or equal to 0.14 and less than or equal to 0.15, or greater than or equal to 0.145 and less than or equal to 0.155.

In embodiments, the $CDF_{DV}$ at a molecular weight greater than 1,200,000 g/mol is greater than or equal to 0.020, such as greater than or equal to 0.025, greater than or equal to 0.030, greater than or equal to 0.035, greater than or equal to 0.040, greater than or equal to 0.045, or greater than or equal to 0.050. In embodiments, the $CDF_{DV}$ at a molecular weight greater than 1,200,000 g/mol is greater than or equal to 0.020 and less than or equal to 0.050, such as greater than or equal to 0.025 and less than or equal to 0.045, or greater than or equal to 0.030 and less than or equal to 0.040. In embodiments, the LDPE has a $CDF_{DV}$ at a molecular weight greater than 1,200,000 g/mol greater than or equal to 0.020 and less than or equal to 0.042, such as greater than or equal to 0.022 and less than or equal to 0.040, greater than or equal to 0.024 and less than or equal to 0.038, or greater than or equal to 0.026 and less than or equal to 0.036.

In embodiments, the cumulative distribution fractions (CDF) for light scattering analysis ($CDF_{LS}$) at a molecular weight less than 100,000 g/mol is less than or equal to 0.100, such as less than or equal to 0.095, less than or equal to 0.090, less than or equal to 0.085, less than or equal to 0.080, less than or equal to 0.075, less than or equal to 0.070, less than or equal to 0.065, less than or equal to 0.060, less than or equal to 0.055, or less than or equal to 0.050. In embodiments, $CDF_{LS}$ at a molecular weight less than 100,000 g/mol is greater than or equal to 0.050 and less than or equal to 0.100, such as greater than or equal to 0.055 and less than or equal to 0.095, greater than or equal to 0.060 and less than or equal to 0.090 greater than or equal to 0.065 and less than or equal to 0.085, or greater than or equal to 0.70 and less than or equal to 0.080. In one embodiment, the LDPE has a $CDF_{LS}$ at a molecular weight less than 100,000 g/mol greater than or equal to 0.06 and less than or equal to 0.10, such as greater than or equal to 0.07 and less than or equal to 0.09, greater than or equal to 0.075 and less than or equal to 0.09, or greater than or equal to 0.08 and less than or equal to 0.09.

In embodiments, the $CDF_{LS}$ at a molecular weight greater than 750,000 g/mol is greater than or equal to 0.430, such as greater than or equal to 0.440, greater than or equal to 0.450, greater than or equal to 0.460, greater than or equal to 0.470, greater than or equal to 0.480, greater than or equal to 0.490, greater than or equal to 0.500, greater than or equal to 0.510, or greater than or equal to 0.520. In embodiments, the $CDF_{LS}$ at a molecular weight greater than 750,000 g/mol is greater than or equal to 0.430 and less than or equal to 0.530 such as greater than or equal to 0.440 and less than or equal to 0.520, greater than or equal to 0.450 and less than or equal to 0.510, greater than or equal to 0.460 and less than or equal to 0.500, or greater than or equal to 0.470 and less than or equal to 0.490. In embodiments, the LDPE has a $CDF_{LS}$ at a molecular weight greater than 750,000 g/mol greater than or equal to 0.430 and less than or equal to 0.530, such as greater than or equal to 0.450 and less than or equal to 0.510, greater than or equal to 0.470 and less than or equal to 0.490, or greater than or equal to 0.460 and less than or equal to 0.500.

Traditionally, it was thought that having as much high molecular weight material as possible was ideal because high molecular weight indicates entanglements that improve the properties of the LDPE. Accordingly, low molecular weight material was kept to a minimum. However, LDPEs according to embodiments disclosed and described herein exhibit unique and unexpected characteristics compared to commercially available LDPE products. For example, embodiments disclosed and described herein have high $CDF_{LS}$ levels for molecular weights greater than 750,000 g/mol, but also show lower $CDF_{LS}$ levels for molecular weights below 100,000 g/mol relative to commercially available LDPE products. The other detectors $CDF_{IR}$ and $CDF_{DV}$, show a similar outcome. The LDPE of the embodiments disclosed and described herein have $CDF_{IR}$ values in high molecular weight regions (such as greater than or equal to 500,000 g/mol) and $CDF_{DV}$ values in high molecular weight regions (such as greater than or equal to 1,200,000 g/mol) that are distinguished from commercially available LDPE samples by their lower or similar CDF values in the lower molecular weight regions.

In embodiments, the ethylene-based polymer has greater than or equal to 1.0 amyl groups ($C_5$) per 1000 total carbon atoms and less than or equal to 3.0 amyl groups ($C_5$) per 1000 total carbon atoms, as determined by $^{13}C$ NMR, such as greater than or equal to 1.2 amyl groups ($C_5$) per 1000 total carbon atoms and less than or equal to 2.9 amyl groups ($C_5$) per 1000 total carbon atoms, greater than or equal to 1.2 amyl groups ($C_5$) per 1000 total carbon atoms and less than or equal to 2.8 amyl groups ($C_5$) per 1000 total carbon atoms, greater than or equal to 1.3 amyl groups ($C_5$) per 1000 total carbon atoms and less than or equal to 2.7 amyl groups ($C_5$) per 1000 total carbon atoms, greater than or equal to 1.4 amyl groups ($C_5$) per 1000 total carbon atoms and less than or equal to 2.6 amyl groups ($C_5$) per 1000 total carbon atoms, greater than or equal to 1.5 amyl groups ($C_5$) per 1000 total carbon atoms and less than or equal to 2.5 amyl groups ($C_5$) per 1000 total carbon atoms, greater than or equal to 1.6 amyl groups ($C_5$) per 1000 total carbon atoms and less than or equal to 2.4 amyl groups ($C_5$) per 1000 total carbon atoms, greater than or equal to 1.7 amyl groups ($C_5$) per 1000 total carbon atoms and less than or equal to 2.3 amyl groups ($C_5$) per 1000 total carbon atoms, greater than or equal to 1.8 amyl groups ($C_5$) per 1000 total carbon atoms and less than or equal to 2.2 amyl groups ($C_5$) per 1000 total carbon atoms, or greater than or equal to 1.9 amyl groups ($C_5$) per 1000 total carbon atoms and less than or equal to 2.1 amyl groups ($C_5$) per 1000 total carbon atoms. In embodiments, the LDPE has greater than or equal to 1.7 amyl groups ($C_5$) per 1000 total carbon atoms and less than or equal to 2.4 amyl groups ($C_5$) per 1000 total carbon atoms, such as greater than or equal to 1.8 amyl groups ($C_5$) per 1000 total carbon atoms and less than or equal to 2.3 amyl groups ($C_5$) per 1000 total carbon atoms, or greater than or equal to 1.9 amyl groups ($C_5$) per 1000 total carbon atoms and less than or equal to 2.2 amyl groups ($C_5$) per 1000 total carbon atoms.

In embodiments, the polymer is a LDPE. In embodiments, the polymer has greater than or equal to 1.5 $C_1$ branches (methyl branches) per 1000 total carbon atoms and less than or equal to 2.5 $C_1$ branches (methyl branches) per 1000 total carbon atoms, such as greater than or equal to 1.6 $C_1$ branches (methyl branches) per 1000 total carbon atoms and less than or equal to 2.4 $C_1$ branches (methyl branches) per 1000 total carbon atoms, greater than or equal to 1.7 $C_1$ branches (methyl branches) per 1000 total carbon atoms and less than or equal to 2.3 $C_1$ branches (methyl branches) per 1000 total carbon atoms, greater than or equal to 1.8 $C_1$ branches (methyl branches) per 1000 total carbon atoms and less than or equal to 2.2 $C_1$ branches (methyl branches) per 1000 total carbon atoms, or greater than or equal to 1.9 $C_1$ branches (methyl branches) per 1000 total carbon atoms and less than or equal to 2.1 $C_1$ branches (methyl branches) per 1000 total carbon atoms. In embodiments, the LDPE has greater than or equal to 1.8 $C_1$ branches (methyl branches) per 1000 total carbon atoms and less than or equal to 2.3 $C_1$ branches (methyl branches) per 1000 total carbon atoms, such as greater than or equal to 1.9 $C_1$ branches (methyl branches) per 1000 total carbon atoms and less than or equal to 2.2 $C_1$ branches (methyl branches) per 1000 total carbon atoms, or greater than or equal to 2.0 $C_1$ branches (methyl branches) per 1000 total carbon atoms and less than or equal to 2.1 $C_1$ branches (methyl branches) per 1000 total carbon atoms.

In embodiments, the ethylene-based polymer has greater than or equal to 1.5 1,3 diethyl branches per 1000 total carbon atoms and less than or equal to 4.0 of 1,3 diethyl branches per 1000 total carbon atoms, such as greater than or equal to 1.6 1,3 diethyl branches per 1000 total carbon atoms and less than or equal to 3.9 of 1,3 diethyl branches per 1000 total carbon atoms, greater than or equal to 1.7 1,3 diethyl branches per 1000 total carbon atoms and less than or equal to 3.8 of 1,3 diethyl branches per 1000 total carbon atoms, greater than or equal to 1.8 1,3 diethyl branches per 1000 total carbon atoms and less than or equal to 3.7 of 1,3 diethyl branches per 1000 total carbon atoms, greater than or equal to 1.9 1,3 diethyl branches per 1000 total carbon atoms and less than or equal to 3.6 of 1,3 diethyl branches per 1000 total carbon atoms, greater than or equal to 2.0 1,3 diethyl branches per 1000 total carbon atoms and less than or equal to 3.5 of 1,3 diethyl branches per 1000 total carbon atoms, greater than or equal to 2.1 1,3 diethyl branches per 1000 total carbon atoms and less than or equal to 3.4 of 1,3 diethyl branches per 1000 total carbon atoms, greater than or equal to 2.2 1,3 diethyl branches per 1000 total carbon atoms and less than or equal to 3.3 of 1,3 diethyl branches per 1000 total carbon atoms, greater than or equal to 2.3 1,3 diethyl branches per 1000 total carbon atoms and less than or equal to 3.2 of 1,3 diethyl branches per 1000 total carbon atoms, greater than or equal to 2.4 1,3 diethyl branches per 1000 total carbon atoms and less than or equal to 3.1 of 1,3 diethyl branches per 1000 total carbon atoms, greater than or equal to 2.5 1,3 diethyl branches per 1000 total carbon atoms and less than or equal to 3.0 of 1,3 diethyl branches per 1000 total carbon atoms, greater than or equal to 2.6 1,3 diethyl branches per 1000 total carbon atoms and less than or equal to 2.9 of 1,3 diethyl branches per 1000 total carbon atoms, or greater than or equal to 2.7 1,3 diethyl branches per 1000 total carbon atoms and less than or equal to 2.9 of 1,3 diethyl branches per 1000 total carbon atoms. In embodiments, the LDPE has greater than or equal to 2.8 1,3 diethyl branches per 1000 total carbon atoms and less than or equal to 4.0 1,3 diethyl branches per 1000 total carbon atoms, such as greater than or equal to 3.0 1,3 diethyl branches per 1000 total carbon atoms and less than or equal to 3.9 1,3 diethyl branches per 1000 total carbon atoms, or greater than or equal to 3.2 1,3 diethyl branches per 1000 total carbon atoms and less than or equal to 3.7 1,3 diethyl branches per 1000 total carbon atoms.

In embodiments, the ethylene-based polymer has greater than or equal to 3.0 and less than or equal to 4.0 of $C_{6+}$ branches per 1000 total carbon atoms, such as greater than or equal to 3.1 and less than or equal to 3.9 of $C_{6+}$ branches per 1000 total carbon atoms, greater than or equal to 3.2 and less than or equal to 3.8 of $C_{6+}$ branches per 1000 total carbon atoms, greater than or equal to 3.3 and less than or equal to 3.7 of $C_{6+}$ branches per 1000 total carbon atoms as determined by $^{13}C$ NMR, or greater than or equal to 3.4 and less than or equal to 3.6 of $C_{6+}$ branches per 1000 total carbon atoms as determined by $^{13}C$ NMR. In embodiments, the LDPE has greater than or equal to 3.0 $C_{6+}$ branches per 1000 total carbon atoms and less than or equal to 3.7 $C_{6+}$ branches per 1000 total carbon atoms, such as greater than or equal to 3.2 $C_{6+}$ branches per 1000 total carbon atoms and less than or equal to 3.5 $C_{6+}$ branches per 1000 total carbon atoms, or greater than or equal to 3.3 $C_{6+}$ branches per 1000 total carbon atoms and less than or equal to 3.4 $C_{6+}$ branches per 1000 total carbon atoms.

In embodiments, the ethylene-based polymer has greater than or equal to 0.5 isolated $C_2$ from butene per 1000 total carbon atoms and less than or equal to 1.5 isolated $C_2$ from butene per 1000 total carbon atoms, such as greater than or equal to 0.6 isolated $C_2$ from butene per 1000 total carbon atoms and less than or equal to 1.4 isolated $C_2$ from butene per 1000 total carbon atoms, greater than or equal to 0.7 isolated $C_2$ from butene per 1000 total carbon atoms and less than or equal to 1.3 isolated $C_2$ from butene per 1000 total carbon atoms, greater than or equal to 0.8 isolated $C_2$ from butene per 1000 total carbon atoms and less than or equal to 1.2 isolated $C_2$ from butene per 1000 total carbon atoms, or greater than or equal to 0.9 isolated $C_2$ from butene per 1000 total carbon atoms and less than or equal to 1.1 isolated $C_2$ from butene per 1000 total carbon atoms. In embodiments, the LDPE has greater than or equal to 0.8 isolated $C_2$ from butene per 1000 total carbon atoms and less than or equal to 1.5 isolated $C_2$ from butene per 1000 total carbon atoms, such as greater than or equal to 0.9 isolated $C_2$ from butene per 1000 total carbon atoms and less than or equal to 1.3 isolated $C_2$ from butene per 1000 total carbon atoms, or greater than or equal to 1.0 isolated $C_2$ from butene per 1000 total carbon atoms and less than or equal to 1.2 isolated $C_2$ from butene per 1000 total carbon atoms.

In embodiments, the ethylene-based polymer has greater than or equal to 0.5 $C_2$ on the quaternary carbon atom per 1000 total carbon atoms and less than or equal to 1.5 $C_2$ on the quaternary carbon atom per 1000 total carbon atoms, such as greater than or equal to 0.6 $C_2$ on the quaternary carbon atom per 1000 total carbon atoms and less than or equal to 1.4 $C_2$ on the quaternary carbon atom per 1000 total carbon atoms, greater than or equal to 0.7 $C_2$ on the quaternary carbon atom per 1000 total carbon atoms and less than or equal to 1.3 $C_2$ on the quaternary carbon atom per 1000 total carbon atoms, greater than or equal to 0.8 $C_2$ on the quaternary carbon atom per 1000 total carbon atoms and less than or equal to 1.2 $C_2$ on the quaternary carbon atom per 1000 total carbon atoms, or greater than or equal to 0.9 $C_2$ on the quaternary carbon atom per 1000 total carbon atoms and less than or equal to 1.1 $C_2$ on the quaternary carbon atom per 1000 total carbon atoms. In embodiments, the LDPE has greater than or equal to 0.8 $C_2$ on the quaternary carbon atom per 1000 total carbon atoms and less than or equal to 1.5 $C_2$ on the quaternary carbon atom per 1000 total carbon atoms, such as greater than or equal to 0.9 $C_2$ on the quaternary carbon atom per 1000 total carbon atoms and less than or equal to 1.3 $C_2$ on the quaternary carbon atom per 1000 total carbon atoms, or greater than or equal to 1.0 $C_2$ on the quaternary carbon atom per 1000 total carbon atoms and less than or equal to 1.2 $C_2$ on the quaternary carbon atom per 1000 total carbon atoms.

In embodiments, the ethylene-based polymer has greater than or equal to 0.12 vinyls per 1000 total carbon atoms and less than or equal to 0.22 vinyls per 1000 total carbon atoms, such as greater than or equal to 0.15 vinyls per 1000 total carbon atoms and less than or equal to 0.20 vinyls per 1000 total carbon atoms. In embodiments, the LDPE has greater than or equal to 0.12 vinyls per 1000 total carbon atoms and less than or equal to 0.20 vinyls per 1000 total carbon atoms, such as greater than or equal to 0.14 vinyls per 1000 total carbon atoms and less than or equal to 0.18 vinyls per 1000 total carbon atoms, or greater than or equal to 0.15 vinyls per 1000 total carbon atoms and less than or equal to 0.16 vinyls per 1000 total carbon atoms.

In embodiments, the ethylene-based polymer has greater than or equal to 0.02 cis and trans groups (vinylene) per 1000 total carbon atoms and less than or equal to 0.12 cis and trans groups (vinylene) per 1000 total carbon atoms, such as greater than or equal to 0.03 cis and trans groups (vinylene) per 1000 total carbon atoms and less than or equal to 0.11 cis and trans groups (vinylene) per 1000 total carbon atoms, greater than or equal to 0.04 cis and trans groups (vinylene) per 1000 total carbon atoms and less than or equal to 0.10 cis and trans groups (vinylene) per 1000 total carbon atoms, greater than or equal to 0.05 cis and trans groups (vinylene) per 1000 total carbon atoms and less than or equal to 0.09 cis and trans groups (vinylene) per 1000 total carbon atoms, or greater than or equal to 0.06 cis and trans groups (vinylene) per 1000 total carbon atoms and less than or equal to 0.08 cis and trans groups (vinylene) per 1000 total carbon atoms. In embodiments, the LDPE has greater than or equal to 0.03 cis and trans groups (vinylene) per 1000 total carbon atoms and less than or equal to 0.09 cis and trans groups (vinylene) per 1000 total carbon atoms, such as greater than or equal to 0.04 cis and trans groups (vinylene) per 1000 total carbon atoms and less than or equal to 0.08 cis and trans groups (vinylene) per 1000 total carbon atoms, or greater than or equal to 0.05 cis and trans groups (vinylene) per 1000 total carbon atoms and less than or equal to 0.07 cis and trans groups (vinylene) per 1000 total carbon atoms.

In embodiments, the ethylene-based polymer has greater than or equal to 0.05 vinylidene per 1000 total carbon atoms and less than or equal to 0.20 vinylidene per 1000 total carbon atoms, greater than or equal to 0.06 vinylidene per 1000 total carbon atoms and less than or equal to 0.19 vinylidene per 1000 total carbon atoms, greater than or equal to 0.07 vinylidene per 1000 total carbon atoms and less than or equal to 0.18 vinylidene per 1000 total carbon atoms, greater than or equal to 0.08 vinylidene per 1000 total carbon atoms and less than or equal to 0.17 vinylidene per 1000 total carbon atoms, greater than or equal to 0.09 vinylidene per 1000 total carbon atoms and less than or equal to 0.16 vinylidene per 1000 total carbon atoms, greater than or equal to 0.10 vinylidene per 1000 total carbon atoms and less than or equal to 0.15 vinylidene per 1000 total carbon atoms, greater than or equal to 0.11 vinylidene per 1000 total carbon atoms and less than or equal to 0.14 vinylidene per 1000 total carbon atoms, or greater than or equal to 0.12 vinylidene per 1000 total carbon atoms and less than or equal to 0.13 vinylidene per 1000 total carbon atoms. In embodiments, the LDPE has greater than or equal to 0.12 vinylidene per 1000 total carbon atoms and less than or equal to 0.18 vinylidene per 1000 total carbon atoms, such as greater than or equal to 0.13 vinylidene per 1000 total carbon atoms and less than or equal to 0.17 vinylidene per 1000 total carbon atoms, or greater than or equal to 0.14 vinylidene per 1000 total carbon atoms and less than or equal to 0.16 vinylidene per 1000 total carbon atoms.

Additives

Compositions of embodiments may comprise one or more additives. Additives include, stabilizers, plasticizers, anti-static agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the LDPE of embodiments. In embodiments, the LDPE are treated with one or more stabilizers, for example, antioxidants, such as IRGANOX 1010, IRGANOX 1076 and IRGAFOS 168 (BASF). It should be understood that in embodiments, no stabilizers are used. In general, the polymers are treated with one or more stabilizers before extrusion or other melt processes. Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosinor petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUF-FLO oil (Lyondell Lubricants; Houston, Tex.).

Blends and mixtures of the LDPE of the embodiments with other polymers may be performed. Suitable polymers for blending with the LDPE of the embodiments include natural and synthetic polymers. Exemplary polymers for blending include propylene-based polymers (both impact modifying polypropylene, isotactic polypropylene, atactic polypropylene, and random ethylene/propylene copolymers), various types of ethylene-based polymers, including high pressure, free-radical LDPE, LLDPE prepared with Ziegler-Natta catalysts, PE prepared with single site catalysts, including multiple reactor PE ("in reactor" blends of Ziegler-Natta PE and single site catalyzed PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), EVA, ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example, polymers available under the trade designation VERSIFY™ Plastomers & Elastomers (The Dow Chemical Company) and VISTAMAXX™ (ExxonMobil Chemical Co.) can also be useful as components in blends comprising the LDPE of embodiments). LLDPE's such as INNATE™, DOWLEX™, and DOWLEX GM™ (The Dow Chemical Company) and Exceed (Exxon Chemical Company) may also be used.

Blends according to embodiments can have can contain recycled materials, such as, for example, "post-consumer resin" ("PCR") and/or "post-industrial resin" ("PIR"), blended with the LDPE disclosed and described herein. PCR and PIR include polymeric materials previously used in a consumer or industry application, respectively. The PCR and PIR may include one or more of a low density polyethylene, linear low density polyethylene, high density polyethylene, a polypropylene, a polyester, a poly(vinyl chloride), a polystyrene, an acrylonitrile butadiene styrene, a polyamide, an ethylene vinyl alcohol, an ethylene vinyl acetate, or a poly-vinyl chloride. The PCR and/or PIR can be included in a monolayer film with the LDPE disclosed and described herein, such as by blending the PCR and/or PIR with the LDPE disclosed and described herein. The PCR and/or PIR can also be included as a layer in a layered film comprising the LDPE disclosed and described herein. In such films, the one or more layers of the PCR and/or PIR can either be incorporated with and/or form any of the skin layer, an inner layer, and/or the core layer of a multi-layer blown film. In other words, the PCR and/or PIR could be in any one of the layers or in multiple layers of the multi-layer film and as the only component of the layer or as a blend component in the layer. In embodiments, the PCR and/or PIR could form or be incorporated in a core layer, which may help to better preserve the properties of the multi-layer film. When used in a multi-layer blown film the PCR and/or PIR can account for 10-80 weight percent (wt. %) of the multi-layer film (weight percent based on the total weight of the multi-layer blown film).

Applications

The LDPE of the embodiments may be employed in a variety of conventional thermoplastic fabrication processes to produce useful articles, including monolayer and multi-layer films; molded articles, such as blow molded, injection molded, or rotomolded articles; coatings; fibers; and woven or non-woven fabrics. The LDPE of the embodiments may be used in a variety of films, including but not limited to, extrusion coating, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

The LDPE of the embodiments is also useful in other direct end-use applications. LDPE of embodiments may be used for wire and cable coating operations, in sheet extrusion for vacuum forming operations, and forming molded articles, including the use of injection molding, blow molding process, or rotomolding processes. Other suitable applications for the LDPE of embodiments include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

Test Methods

The testing methods include the following:

Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt flow index, or Melt index or $I_2$, was measured in accordance with ASTM D 1238-10, Condition 190° C./2.16 kg, Method B, and was reported in grams eluted per 10 minutes.

Nuclear Magnetic Resonance ($^{13}$C NMR)

Samples were prepared by adding approximately "3 g" of 1,1,2,2-tetrachloroethane (TCE) containing 12 wt % TCE-d2 and 0.025 M Cr(AcAc)$_3$," to a "0.25 to 0.40 g" polymer sample, in a 10 mm NMR tube. Oxygen was removed from the sample by purging the headspace with nitrogen. The samples were then dissolved, and homogenized by heating the tube and its contents to 120-140° C. using a heating block and heat gun. Each dissolved sample was visually inspected to ensure homogeneity. Samples were thoroughly mixed immediately prior to analysis and were not allowed to cool before insertion into the heated NMR sample holders.

All data were collected using a Bruker 600 MHz spectrometer equipped with a 10 mm extended temperature cryoprobe. The data was acquired using a 7.8 second pulse repetition delay, 90-degree flip angles, and inverse gated decoupling, with a sample temperature of 120° C. All measurements were made on non-spinning samples in locked mode. Samples were allowed to thermally equilibrate for seven minutes prior to data acquisition. The 13C NMR chemical shifts were internally referenced to the EEE triad at 30.0 ppm. The "C$^{6+}$" value is a direct measure of C$^{6+}$ branches in LDPE, where the long branches are not distinguished from "chain ends." The "32.2 ppm" peak, representing the third carbon from the end of all chains or branches of six or more carbons, is used to determine the "C$^{6+}$" value.

TABLE 1

Branching Type and 13C NMR integral ranges used for quantitation

| Branch Type | Peak(s) integrated | Identity of the integrated carbon peak(s) |
|---|---|---|
| 1,3 diethyl | about 10.5 to 11.5 ppm | 1,3 diethyl branch methyls |
| C2 on quaternary carbon | about 7.5 to 8.5 ppm | 2 ethyl branches on a quaternary carbon, methyls |
| C1 | about 19.75 to 20.50 ppm | C1, methyl branches |
| C4 | about 23.3 to 23.5 ppm | Second CH$_2$ in a 4-carbon branch, counting the methyl as the first C |
| C5 | about 32.60 to 32.80 ppm | Third CH$_2$ in a 5-carbon branch, counting the methyl as the first C |
| or C6+ | About 32.1 to 32.3 ppm | The third CH$_2$ (counting the methyl as the first C) in any branch of 6 or more carbons in length |

Nuclear Magnetic Resonance ($^1$H NMR)

The samples were prepared by adding approximately 120 mg of sample to "3.25 g of 50/50, by weight, tetrachlorethane-d2/perchloroethylene" with 0.001 M Cr(AcAc)$_3$, in a 10 mm NMR tube. The samples were purged by bubbling N$_2$ through the solvent, via a pipette inserted into the tube, for approximately five minutes, to prevent oxidation. Each tube was capped and sealed with TEFLON tape. The samples were heated and vortexed at 110-115° C. to ensure homogeneity.

The $^1$H NMR was performed on a Bruker 600 MHz spectrometer equipped with a 10 mm extended temperature cryoprobe. The data was acquired with ZG pulse, 64 scans, a 15.8 second pulse repetition delay and a sample temperature of 120° C.

The signal from the whole polymer, about 3 to –0.5 ppm, was set to an arbitrary value, typically 20,000. The corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

The integral of the whole polymer from the control experiment was divided by two, to obtain a value representing X thousands of carbons (i.e., if the polymer integral=20,000, this represents 10,000 carbons, and X=10).

The unsaturated group integrals, divided by the corresponding number of protons contributing to that integral, represent the moles of each type of unsaturation per X thousand carbons. Dividing the moles of each type of unsaturation by X, then gives the moles of unsaturated groups per 1000 moles of carbons.

Melt Strength

Melt strength measurements were conducted on a Göttfert Rheotens 71.97 (Göttfert Inc.; Rock Hill, SC), attached to a Göttfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the peak or maximum plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Dynamic Mechanical Spectroscopy (DMS)

Resins were compression-molded into "3 mm thick×1 inch" circular plaques at 177° C., for five minutes, under 25,000 psi pressure, in air. The sample was then taken out of the press, and placed on a counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium.

The experiments were performed at 190° C. over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were calculated from these data.

GPC

Triple Detector Gel Permeation Chromatography (TDGPC)—

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration and calculation of the conventional molecular weight moments and the distribution (using the 20 um "Mixed A" columns) were performed according to the method described in the Conventional GPC procedure.

The Systematic Approach for the determination of multi-detector offsets is done in a manner consistent with that published by Balke, Mourey, et. al. (Mourey and Balke, Chromatography Polym. Chpt 12, (1992)) (Balke, Thitirat-sakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software. As used herein, "MW" refers to molecular weight.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IRS) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity (IV). The chromatographic concentrations are assumed low enough to eliminate addressing 2nd viral coefficient effects (concentration effects on molecular weight).

The absolute weight average molecular weight (Mw (Abs)) is obtained (using GPCOne™) from the Area of the Light Scattering (LS) integrated chromatogram (factored by the light scattering constant) divided by the mass recovered from the mass constant and the mass detector (IRS) area. The molecular weight and intrinsic viscosity responses are extrapolated at chromatographic ends where signal to noise becomes low (using GPCOne™). Other respective moments, $Mn_{(Abs)}$ and $Mz_{(Abs)}$ are be calculated according to equations 1-2 as follows:

$$Mn_{(Abs)} = \frac{\sum_i IR_i}{\sum_i (IR_i / M_{Absolute_i})} \quad \text{(EQ 1)}$$

$$Mn_{(Abs)} = \frac{\sum_i (IR_i * M_{Absolute_i}^2)}{\sum_i (IR_i * M_{Absolute_i})} \quad \text{(EQ 2)}$$

Conventional GPC

The chromatographic system consisted of a PolymerChar GPC-IR (Valencia, Spain) high temperature GPC chromatograph equipped with an internal IRS infra-red detector (IRS) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 g/mol to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$MW_{polyethylene} = A \times (Mw_{polystyrene})^B \quad \text{(EQ3)}$$

where MW is the molecular weight, A has a value of 0.4315 and B is equal to 1.0.

A fifth order polynomial was used to fit the respective polyethylene-equivalent calibration points. A small adjustment to A (from approximately 0.395 to 0.440) was made to correct for column resolution and band-broadening effects such that of a linear homopolymer polyethylene standard is obtained at 120,000 g/mol Mw.

The total plate count of the GPC column set was performed with decane (prepared at 0.04 g in 50 milliliters of TCB.) The plate count (Equation 4) and symmetry (Equation 5) were measured on a 200 microliter injection according to the following equations:

$$\text{Plate Count} = 5.54 * \left( \frac{RV_{Peak\ Max}}{\text{Peak Width at } \frac{1}{2} \text{ height}} \right)^2 \quad (EQ4)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ5)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of Mn(conv), Mw(conv), and Mz(conv) were based on GPC results using the internal IRS detector (measurement channel) of the PolymerChar GPC-IR chromatograph according to Equations 6-8, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn(conv) = \frac{\sum^i IR_i}{\sum^i (IR_i/M_{polyethylene_i})} \quad (EQ\ 6)$$

$$Mw(conv) = \frac{\sum^i (IR_i * M_{polyethylene_i})}{\sum^i IR_i} \quad (EQ\ 7)$$

$$Mz(conv) = \frac{\sum^i (IR_i * M^2_{polyethylene_i})}{\sum^i (IR_i * M_{polyethylene_i})} \quad (EQ\ 8)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 9. Processing of the flow marker peak was done via the PolymerChar GPCOne™ Software. Acceptable flowrate correction is such that the effective flowrate should be within +/−2% of the nominal flowrate.

Flowrate (effective) = (EQ9)

Flowrate (nominal) * (RV(FM Calibrated)/RV(RM Sample))

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IRS) and the light scattering constant (determined using GPCOne™) should be determined from a linear standard with a molecular weight in excess of about 50,000 g/mol.

CDF Calculation Method

The calculation of the cumulative detector fractions (CDF) for the IRS measurement detector ("$CDF_{IR}$"), cumulative detector factions from the viscosity detector ("$CDF_{DV}$") and the low angle laser light scattering detector ("$CDF_{LS}$") are accomplished by the following steps (Visually Represented as FIG. 2, FIG. 3, and FIG. 4 for $CDF_{IR}$, $CDF_{DV}$, and $CDF_{LS}$):

1) Linearly flow correct the chromatogram based on the relative retention volume ratio of the air peak between the sample and that of a consistent narrow standards cocktail mixture.
2) Correct the light scattering detector offset relative to the refractometer as described in the Gel Permeation Chromatography (GPC) section.
3) Calculate the molecular weights at each retention volume (RV) data slice based on the polystyrene calibration curve, modified by the polystyrene to polyethylene conversion factor of approximately (0.395 and 0.440) as described in the Gel Permeation Chromatography (GPC) section.
4) Subtract baselines from the light scattering and refractometer chromatograms and set integration windows using standard GPC practices making certain to integrate all of the low molecular weight retention volume range in the light scattering chromatogram that is observable from the refractometer chromatogram (thus setting the highest RV limit to the same index in each chromatogram). Do not include any material in the integration which corresponds to less than 150 g/mol in either chromatogram.

Figure 2:
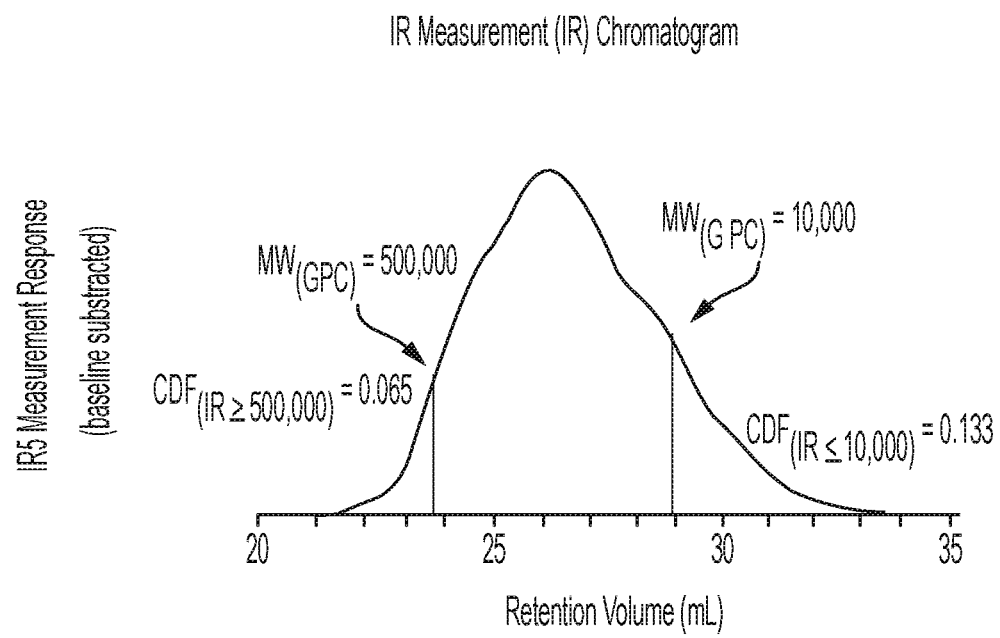
FIG. 2 graphically depicts a $CDF_{IR}$ chromatogram for Example 1 according to embodiments disclosed and described herein.
Figure 3:
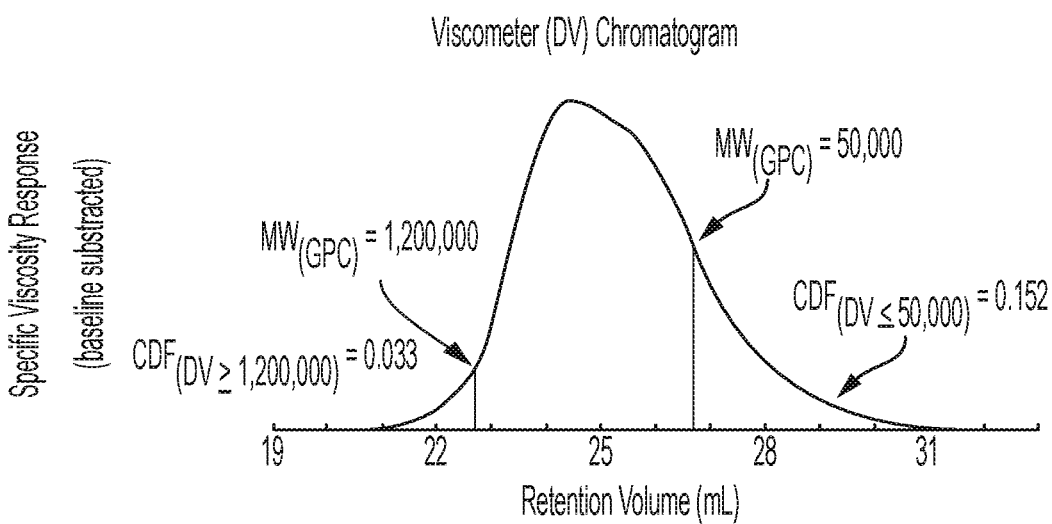
FIG. 3 graphically depicts a $CDF_{DV}$ chromatogram for Example 1 according to embodiments disclosed and described herein.
Figure 4:
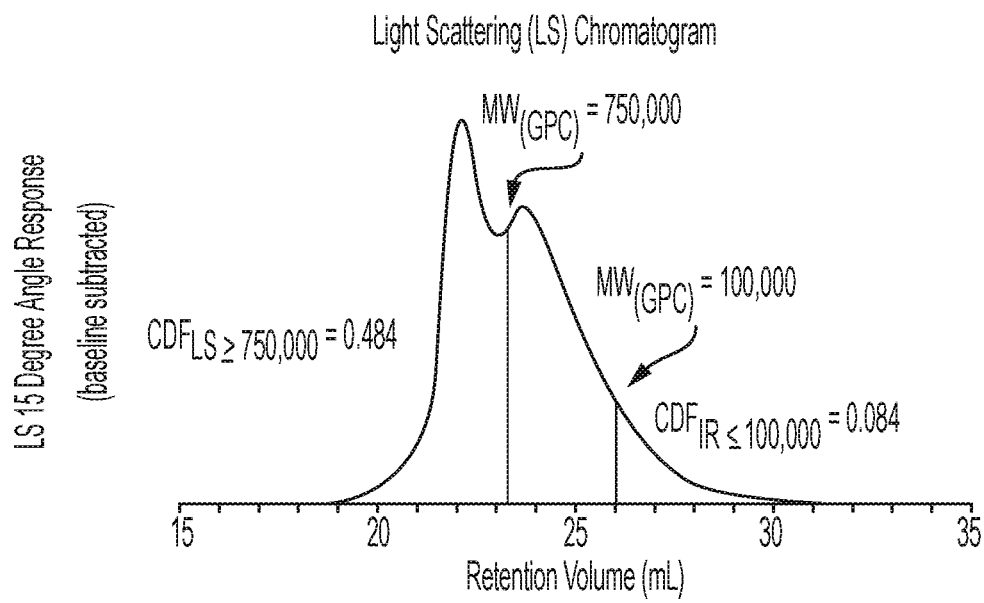
FIG. 4 graphically depicts a $CDF_{LS}$ chromatogram for Example 1 according to embodiments disclosed and described herein.

5) Calculate the cumulative detector fraction (CDF) of the IRS Measurement sensor ($CDF_{IR}$), viscosity chromatogram ($CDF_{DV}$) and Low-Angle Laser Light Scattering (LALLS) chromatogram ($CDF_{LS}$) based on its baseline-subtracted peak height (H) from high to low molecular weight (low to high retention volume) at each data slice (j) according to Equations 10A, 10B, 10C, 10D, 10E, and 10F and shown in FIG. 2, FIG. 3 and FIG. 4 for Example 1:

$$CDF_{IR \leq 10,000MW} = \frac{\sum_{j=RV \text{ at } 10,000 \text{ MW}}^{j=RV \text{ at Highest Integrated Volume}} H_j}{\sum_{j=RV \text{ at Lowest Integrated Volume}}^{j=RV \text{ at Highest Integrated Volume}} H_j} \quad \text{(Eq 10A)}$$

$$CDF_{IR \geq 500,000MW} = \frac{\sum_{j=RV \text{ at Lowest Integrated Volume}}^{j=RV \text{ at 500,000 MW}} H_j}{\sum_{j=RV \text{ at Lowest Integrated Volume}}^{j=RV \text{ at Highest Integrated Volume}} H_j} \quad \text{(Eq 10B)}$$

$$CDF_{DV \leq 50,000MW} = \frac{\sum_{j=RV \text{ at 500,000 MW}}^{j=RV \text{ at Highest Integrated Volume}} H_j}{\sum_{j=RV \text{ at Lowest Integrated Volume}}^{j=RV \text{ at Highest Integrated Volume}} H_j} \quad \text{(Eq 10C)}$$

$$CDF_{DV \geq 1,200,000MW} = \frac{\sum_{j=RV \text{ at Lowest Integrated Volume}}^{j=RV \text{ at 1,200,000 MW}} H_j}{\sum_{j=RV \text{ at Lowest Integrated Volume}}^{j=RV \text{ at Highest Integrated Volume}} H_j} \quad \text{(Eq 10D)}$$

$$CDF_{LS \leq 100,000MW} = \frac{\sum_{j=RV \text{ at 100,000 MW}}^{j=RV \text{ at Highest Integrated Volume}} H_j}{\sum_{j=RV \text{ at Lowest Integrated Volume}}^{j=RV \text{ at Highest Integrated Volume}} H_j} \quad \text{(Eq 10E)}$$

$$CDF_{LS \geq 750,000MW} = \frac{\sum_{j=RV \text{ at Lowest Integrated Volume}}^{j=RV \text{ at 750,000 MW}} H_j}{\sum_{j=RV \text{ at Lowest Integrated Volume}}^{j=RV \text{ at Highest Integrated Volume}} H_j} \quad \text{(Eq 10F)}$$

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the infrared (IRS) chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (11) and (12):

$$MW_{PE} = (K_{PS}/K_{PE})^{1/\alpha_{PE}+1} \cdot MW_{PS}^{\alpha_{PS}+1/\alpha_{PE}+1} \quad \text{(Eq. 11)}$$

$$[\eta]_{PE} = K_{PS} \cdot MW_{PS}^{\alpha+1}/MW_{PE}. \quad \text{(Eq. 12)}$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw(abs)) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equation (13). This area calculation offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (13):

$$IV_w = \frac{\sum_i c_i IV_i}{\sum_i c_i} = \frac{\sum_i \eta_{sp_i}}{\sum_i c_i} = \frac{\text{Viscometer Area}}{\text{Conc. Area}} \quad \text{(Eq. 13)}$$

where $\eta_{sp_i}$ stands for the specific viscosity as acquired from the viscometer detector.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations (14) and (15):

$$[\eta]_{cc} = \frac{\sum_i c_i IV_{i,cc}}{\sum_i c_i} = \frac{\sum_i c_i K(M_{i,cc})^a}{\sum_i c_i} \quad \text{(Eq. 14)}$$

Equation (15) is used to determine the gpcBR branching index:

$$gpcBR = \left[ \left( \frac{[\eta]_{cc}}{[\eta]} \right) \left( \frac{M_w}{M_{w,cc}} \right)^{\alpha_{PE}} - 1 \right] \quad \text{(Eq. 15)}$$

wherein [η] is the measured intrinsic viscosity, $[\eta]_{cc}$ is the intrinsic viscosity from the conventional calibration, Mw is the measured weight average molecular weight, and $Mw_{,cc}$ is the weight average molecular weight of the conventional calibration. The weight average molecular weight by light scattering (LS) is commonly referred to as "absolute weight average molecular weight" or "Mw, Abs." The Mw,cc from Equation (7) using conventional GPC molecular weight calibration curve ("conventional calibration") is often referred to as "polymer chain backbone molecular weight," "conventional weight average molecular weight," and "Mw (cony)."

All statistical values with the "cc" subscript are determined using their respective elution volumes, the corresponding conventional calibration as previously described, and the concentration ($C_1$). The non-subscripted values are measured values based on the mass detector, LALLS, and viscometer areas. The value of KPE is adjusted iteratively, until the linear reference sample has a gpcBR measured value of zero. For example, the final values for α and Log K for the determination of gpcBR in this particular case are 0.725 and −3.391, respectively, for polyethylene, and 0.722 and −3.993, respectively, for polystyrene. Once the K and a values have been determined using the procedure discussed previously, the procedure is repeated using the branched samples. The branched samples are analyzed using the final Mark-Houwink constants obtained from the linear reference as the best "cc" calibration values. For linear polymers, gpcBR calculated from Equation (15) will be close to zero, since the values measured by LS and viscometry will be close to the conventional calibration standard. For branched polymers, gpcBR will be higher than zero, especially with high levels of long chain branching, because the measured polymer molecular weight will be higher than the calculated Mw,cc, and the calculated IVcc will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight. For these particular examples, the advantage of using gpcBR, in comparison to a traditional "g′ index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

LSP Parameter

Figure 5:
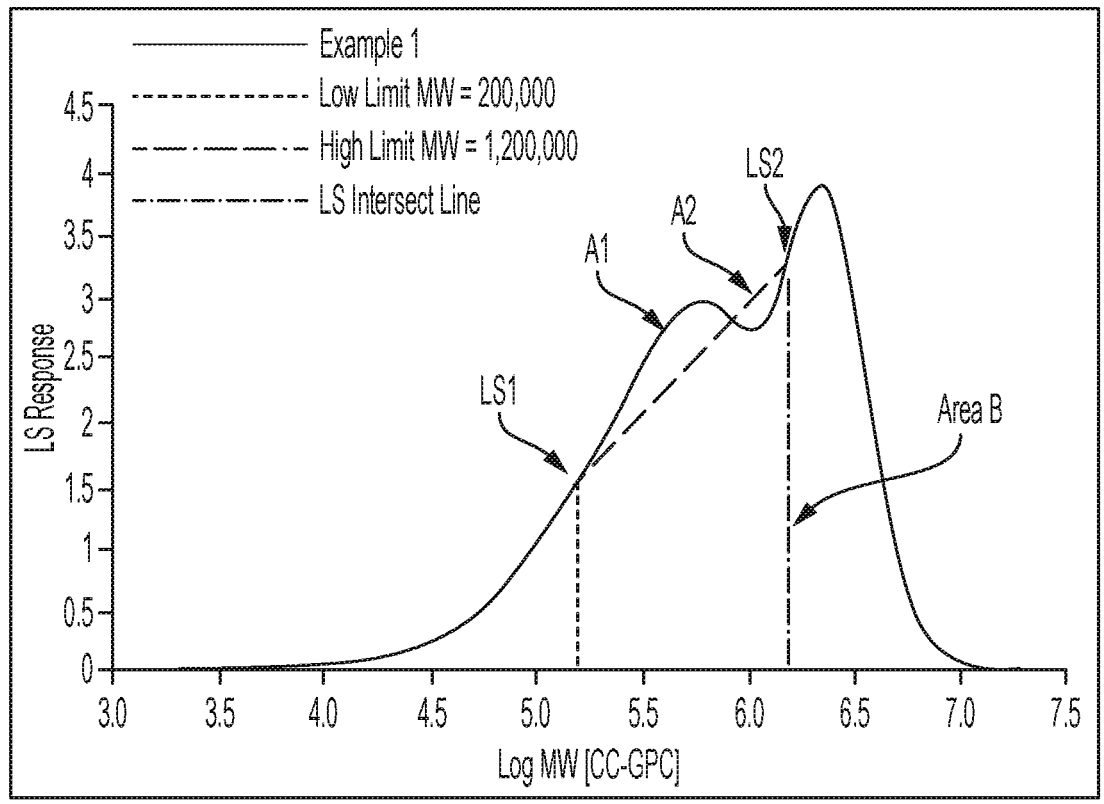
FIG. 5 graphically depicts a LSP chromatogram for Example 1 according to embodiments disclosed and described herein.

Representative values for the GPC Light Scattering Parameters (LSP) can be found in Tables 1 and 2 and FIG. 5 for Example 1. Analysis of materials were performed in a similar manner to U.S. Pat. No. 8,916,667B2 (Karjala et al.). The X-axis in the plot is the logarithmic value of the molecular weight by conventional GPC calculation, or cc-GPC molecular weight. The y-axis is the LS detector response normalized for equal sample concentrations, as measured by the peak area of the concentration detector (not shown). The specific features of the LS elution profile are captured as defined by two log-molecular weight limits. The lower limit corresponds to a MW1 value of 200,000 g/mol and the upper limit corresponds to a MW2 value of 1,200.00 g/mol. The vertical lines of these two molecular weight limits intersect with the LS elution curve at two points. A line segment is drawn connecting these two intercept points. The height of the LS signal at the first intercept (log MW1) gives the LS1 quantity. The height of the LS signal at the second intercept (log MW2) gives the LS2 quantity. The area under the LS elution curve within the two molecular weight limits gives the quantity Area B. Comparing the LS curve with the line segment connecting the two intercepts, there can be part of the segregated area that it is above the line segment (see A2 in FIG. 5, defined as a negative value) or below the line segment (like A1 in FIG. 5, defined as a positive value). The sum of A1 and A2 gives the quantity Area A, the total Area A. This total area A can be calculated as the difference between the Area B and the area below the line segment.

The steps of calculating the "LS" quantity are illustrated with Example 1 shown in Tables 1 and Table 2.

Step 1 "Calculate SlopeF in Table 1, using the following two equations:

$$\text{Slope\_value} = [(LS2 - LS1)/LS2]/dLogMW$$

$$SlopeF = \text{a slope function} = abs(\text{slope\_value} - 0.42) + 0.001$$

Step 2, calculate 'AreaF' and "LSF' in Table 2, using the following two equations:

$$\text{Area } F = \text{an area function} = Abs(Abs(A/B) + 0.033) - 0.005) \text{ Where,}$$

$$A/B = (\text{Area } A)/(\text{Area } B) \quad LSP = \text{Log}(\text{Area } F * SlopeF) + 4$$

TABLE 2

The "SlopeF" Calculation

| Sample | MW1 = 200,000 g/mol | | MW2 = 1,200,000 g/mol | | Log (MW2) − Log (MW1) | | Abs (slope − 0.42) + 0.001 |
| | LS1 | Log MW1 | LS2 | Log MW2 | dLog MW | Slope Value | Slope F |
| --- | --- | --- | --- | --- | --- | --- | --- |
| Ex. 1 | 1.79 | 5.30 | 2.79 | 6.08 | 0.78 | 0.4642 | 0.0452 |

TABLE 3

The "AreaF" and "LSP" Calculation

| Sample | LS Curve Area B | Area A (A1 + A2) | A/B | Abs (Abs (A/B) + 0.033) − 0.005 = Area F | Log (AreaF* SlopeF) + 4 = LSP |
| --- | --- | --- | --- | --- | --- |
| Ex. 1 | 351.675 | −42.332 | −0.1204 | 0.0823 | 1.57 |

Calculation of LCB frequency ($LCB_f$)

The $LCB_f$ was calculated for each polymer sample by the following procedure:
1) The light scattering, viscosity, and concentration detectors were calibrated with NBS 1475 homopolymer polyethylene (or equivalent reference).
2) The light scattering and viscometer detector offsets were corrected relative to the concentration detector as described above in the calibration section (see references to Mourey and Balke).

3) Baselines were subtracted from the light scattering, viscometer, and concentration chromatograms and set integration windows making certain to integrate all of the low molecular weight retention volume range in the light scattering chromatogram that is observable from the refractometer chromatogram.
4) A linear homopolymer polyethylene Mark-Houwink reference line was established by injecting a standard with a polydispersity of at least 3.0, calculate the data file (from above calibration method), and record the intrinsic viscosity and molecular weight from the mass constant corrected data for each chromatographic slice.
5) The LDPE sample of interest was analyzed, the data file (from above calibration method) was calculated, and the intrinsic viscosity and molecular weight from the mass constant, corrected data for each chromatographic slice, were recorded. At lower molecular weights, the intrinsic viscosity and the molecular weight data may need to be extrapolated such that the measured molecular weight and intrinsic viscosity asymptotically approach a linear homopolymer GPC calibration curve.
6) The homopolymer linear reference intrinsic viscosity was shifted at each point (i) by the following factor: IVi=IVi*0.946 where IV is the intrinsic viscosity.
7) The homopolymer linear reference molecular weight was shifted by the following factor: MW=MW*1.57 where MW is the molecular weight.
8) The g' at each chromatographic slice was calculated according to the following equation: g'=(IV(LDPE)/IV (linear reference)), at the same MW. The IV(linear reference) was calculated from a fifth-order polynomial fit of the reference Mark-Houwink Plot and where IV(linear reference) is the intrinsic viscosity of the linear homopolymer polyethylene reference (adding an amount of SCB (short chain branching) to account for backbiting through 6) and 7) at the same molecular weight (MW)). The IV ratio is assumed to be one at molecular weights less than 3,500 g/mol to account for natural scatter in the light scattering data.
9) The number of branches at each data slice was calculated according to Equation 16:

$$\left[\frac{IV_{LDPE}}{IV_{linear\_reference}}\right]_M^{1.33} = \left[\left(1+\frac{B_n}{7}\right)^{1/2}+\frac{4}{9}\frac{B_n}{\pi}\right]^{1/2}. \quad (Eq\ 16)$$

10) The average LCB quantity was calculated across all of the slices (i), according to Equation 17:

$$LCB_{1000C} = \frac{\sum_{M=3500}^{i}\left(\frac{B_{ni}}{M_i*14000}C_i\right)}{\sum C_i}. \quad (Eq\ 17)$$

Hexane Extractables

Polymer pellets (from polymerization pelletization process, without further modification; approx. 2.2 grams per one "1-inch×1-inch" square film) were pressed in a Carver Press at a thickness of 3.0-4.0 mils. The pellets were pressed at 190° C. for 3 minutes at 8,000 psi followed by cooling for 3 minutes followed by another pressing at 190° C. for 3 minutes at 40,000 psi followed by cooling (12 minutes total). Non-residue gloves (PIP* CleanTeam* CottonLisle Inspection Gloves, Part Number: 97-501) were worn to prevent contamination of the film with residual oils from the operator hands. Each film was trimmed to a "1-inch×1-inch" square, and weighed (2.5±0.05 g). The films were extracted for 2 hours, in a hexane vessel, containing about 1000 ml of hexane, at 49.5±0.5° C., in a heated water bath. The hexane was an isomeric "hexanes" mixture (for example, Hexanes (Optima), Fisher Chemical, high purity mobile phase for HPLC and/or extraction solvent for GC applications). After two hours, the films were removed, rinsed in clean hexane, and dried in a vacuum oven (80±5° C.) at full vacuum (ISOTEMP Vacuum Oven, Model 281A, at approx. 30 inches Hg) for two hours. The films were then placed in a desiccator, and allowed to cool to room temperature for at least one hour. The films were then reweighed, and the amount of mass loss due to extraction in hexane was calculated. This method is based on 21 CRF 177.1520 (d)(3)(ii), with one deviation from FDA protocol by using hexanes instead of n-hexane; reported average of 3 measurements.

Film Testing

The following physical properties were measured on the films as described in the experimental section. Prior to testing, the film was conditioned for at least 40 hours (after film production) at 23° C. (+/−2° C.) and 50% relative humidity (+/−10% R.H).

Total Haze:

Total haze was measured according to ASTM D 1003-07. A Hazegard Plus (BYK-Gardner USA; Columbia, MD) was used for testing. Five samples were examined and an average reported. Sample dimensions were "6 in ×6 in".

45° Gloss

ASTM D2457-08 (average of five film samples; each sample "10 in ×10 in").

Clarity

ASTM D1746-09 (average of five film samples; each sample "10 in ×10 in").

MD and CD Elmendorf Tear Strength

ASTM D1922-09. The force in grams required to propagate tearing across a film or sheeting specimen is measured using a precisely calibrated pendulum device. Acting by gravity, the pendulum swings through an arc, tearing the specimen from a precut slit. The specimen is held on one side by the pendulum and on the other side by a stationary member. The loss in energy by the pendulum is indicated by a pointer or by an electronic scale. The scale indication is a function of the force required to tear the specimen. The sample used is the 'constant radius geometry' as specified in D1922. Testing would be typically carried out on samples that have been cut from both the MD and CD directions. Prior to testing, the sample thickness is measured at the sample center. A total of 15 specimens per direction are tested, and the average tear strength is reported. Samples that tear at an angle greater than 60° from the vertical are described as 'oblique' tears—such tears should be noted, though the strength values are included in the average strength calculation.

MD and CD Tensile Strength

ASTM D882-10 (average of five film samples in each direction). Tensile test strips are cut from a sheet in (if applicable) the machine and cross directions (MD and CD). Strips are 1 inch wide by approximately 8 inches long. The samples are loaded onto a tensile testing frame using line grip jaws (flat rubber on one side of the jaw and a line grip on the other side of the jaw) set at a gauge length (line grip to line grip distance) of 2 inches. The samples are then strained at a crosshead speed of 20 inches/min. From the resulting load-displacement curve the yield strength, yield strain, stress at break, strain at break and energy to break can be determined.

Dart

ASTM D1709-09. The test result is reported by Method A, which uses a 1.5" diameter dart head and 26" drop height. The sample thickness is measured at the sample center, and the sample is then clamped by an annular specimen holder with an inside diameter of 5 inches. The dart is loaded above the center of the sample and released by either a pneumatic or electromagnetic mechanism. Testing is carried out according to the 'staircase' method. If the sample fails, a new sample is tested with the weight of the dart reduced by a known and fixed amount. If the sample does not fail, a new sample is tested with the weight of the dart increased by a known increment. After 20 specimens have been tested the number of failures is determined. If this number is 10 then the test is complete. If the number is less than 10, the testing continues until 10 failures have been recorded. If the number is greater than 10, testing is continued until the total number of non-failures is 10. The dart (strength) is determined from these data as per ASTM D1709.

Puncture Strength

Puncture is measured on a tensile testing machine. Square specimens are cut from a sheet to a size of 6 inches by 6 inches. The specimen is clamped in a 4 inch diameter circular specimen holder and a puncture probe is pushed into the center of the clamped film at a cross head speed of 10 inches/minute. The test method is designed by Dow and uses a probe with a 0.5 inch diameter polished steel ball on a 0.25 inch diameter support rod. There is an approximate 12 inch maximum travel length to prevent damage to the test fixture. There is no gauge length; prior to testing the probe is as close as possible to, but not touching, the specimen. A single thickness measurement is made in the center of the specimen. For each specimen, the maximum force, force at break, penetration distance, energy to break and puncture strength (energy per unit volume of the sample) is determined. A total of 5 specimens are tested to determine an average puncture value. The puncture probe is cleaned using a "Kim-wipe" after each specimen.

EXAMPLES

The following examples illustrate features of the present disclosure but are not intended to limit the scope of the disclosure.

LDPE Examples and Comparative Examples

A process system as described in FIG. 1 was used to produce the various examples and comparative examples. The process parameters set forth in Tables 4 and 5 were used. Peroxide (PO) initiator flows in pounds per hour at each injection point used for manufacturing Examples 1-3 are in Table 4. Process conditions used to manufacture Examples 1-3 are in Table 5.

TABLE 4

| Reaction Zone | Initiator | Examples 1-3 Peroxide Flow lb/hr | Examples 4-16 Peroxide Flow lb/hr | Examples 17-19 Peroxide Flow lb/hr |
|---|---|---|---|---|
| #1 | TBPIV | 2.4 | 2.4 | 2.6 |
| #1 | TBPO | 3.6 | 3.6 | 4.0 |
| #1 | TBPA | 1.4 | 1.4 | 1.5 |
| #1 | DTBP | 0.5 | 0.5 | 0.6 |
| #2 | TBPIV | 0.8 | 0.8 | 1.0 |
| #2 | TBPO | 1.2 | 1.2 | 1.4 |
| #2 | TBPA | 4.4 | 4.5 | 5.1 |
| #2 | DTBP | 4.4 | 4.5 | 5.1 |
| #3 | TBPA | 1.8 | 1.7 | 2.0 |
| #3 | DTBP | 5.4 | 5.0 | 5.8 |
| #4 | TBPA | 0.6 | 0.5 | 0.6 |
| #4 | DTBP | 0.5 | 0.5 | 0.4 |

TABLE 5

| Process Variables | Examples 1-3 | Examples 4-16 | Examples 17-19 |
|---|---|---|---|
| Reactor Pressure (PSIg) | 39,900 | 39,900 | 39,900 |
| Zone 1 Initiation T (° C.) | 142 | 142 | 142 |
| Zone 1 Peak T (° C.) | 285 | 285 | 285 |
| Zone 2 Initiation T (° C.) | 166 | 165 | 166 |
| Zone 2 Peak T (° C.) | 310 | 310 | 310 |
| Zone 3 Initiation T (° C.) | 256 | 262 | 261 |
| Zone 3 Peak T (° C.) | 308 | 308 | 308 |
| Zone 4 Initiation T (° C.) | 271 | 276 | 276 |
| Zone 4 Peak T (° C.) | 288 | 288 | 288 |
| Fresh ethylene Flow (lbs/hr) | 87,485 | 89,500 | 89,540 |
| Ethylene Throughput to Reactor (lbs/hr) | 273,765 | 270,380 | 289,740 |
| Ethylene Purge Flow (lbs/hr) | 2,692 | 2640 | 2650 |
| Reactor Cooling System 1 T (° C.) | 190 | 190 | 190 |
| Reactor Cooling System 2 T (° C.) | 185 | 188 | 185 |

The various comparative examples and examples were tested according to the testing procedures disclosed herein to measure the density, melt index ($I_2$), peak melt strength, and hexane extractables as shown in Table 6 below.

TABLE 6

| Description | Density (g/cm³) | I2 (g/10 min) | Peak Melt Strength (cN) | Hexane Extractables (wt %) |
|---|---|---|---|---|
| Comparative Example 1 | 0.9198 | 0.16 | 16.7 | 1.18 |
| Example 1 | 0.9202 | 0.18 | 24.8 | 1.55 |
| Example 2 | 0.9199 | 0.13 | 25.6 | 1.55 |
| Example 3 | 0.9202 | 0.19 | 24.6 | 1.55 |
| Comparative Example 2 | 0.9187 | 0.25 | 22.1 | 1.85 |
| Comparative Example 3 | 0.9204 | 0.29 | 17.6 | 1.51 |
| Example 4 | 0.9195 | 0.19 | 30.7 | 1.60 |
| Example 5 | 0.9196 | 0.12 | 29.5 | 1.47 |
| Example 6 | 0.9198 | 0.08 | 33.8 | 1.44 |
| Example 7 | 0.9198 | 0.11 | 32.4 | 1.47 |
| Example 8 | 0.9192 | 0.15 | 27.3 | — |
| Example 9 | 0.9198 | 0.13 | 28.8 | — |
| Example 10 | 0.9198 | 0.09 | 30.0 | — |
| Example 11 | 0.9201 | 0.09 | 31.7 | — |
| Example 12 | 0.9202 | 0.10 | 30.1 | — |
| Example 13 | 0.9198 | 0.17 | 30.0 | — |
| Example 14 | 0.9193 | 0.11 | 31.2 | — |
| Example 15 | 0.9204 | 0.12 | 30.5 | — |
| Example 16 | 0.9199 | 0.14 | 29.0 | — |
| Example 17 | 0.9199 | 0.16 | 27.5 | 1.55 |
| Example 18 | 0.9201 | 0.17 | 32.5 | 1.61 |
| Example 19 | 0.9200 | 0.13 | 33.0 | 1.55 |

Molecular weight data for the various comparative examples and examples was measured according to the testing procedures disclosed herein, as shown in Table 7 below using both conventional (cony) and light scattering or absolute (abs) GPC methods.

TABLE 7

| Description | Mn (g/mol) (conv) | Mw (g/mol) (conv) | Mz (g/mol) (conv) | Mw/Mn (conv) | Mw (g/mol) (abs) | Mw(abs)/ Mw(conv) | LCBf | gpcBR |
|---|---|---|---|---|---|---|---|---|
| Comparative Example 1 | 20,162 | 127,869 | 570,009 | 6.3 | 291,085 | 2.28 | 1.16 | 2.14 |
| Example 1 | 17,512 | 154,671 | 626,795 | 8.8 | 368,965 | 2.39 | 1.89 | 2.58 |
| Example 2 | 16,672 | 152,643 | 634,895 | 9.2 | 357,332 | 2.34 | 1.77 | 2.53 |
| Example 3 | 16,734 | 153,790 | 649,934 | 9.2 | 372,143 | 2.42 | 1.96 | 2.60 |
| Comparative Example 2 | 16,462 | 181,453 | 932,972 | 11.0 | 514,460 | 2.84 | 2.21 | 3.34 |
| Comparative Example 3 | 16,546 | 141,000 | 680,432 | 8.5 | 345,027 | 2.45 | 1.76 | 2.56 |
| Example 4 | 14,851 | 146,075 | 524,187 | 9.8 | 310,242 | 2.12 | 1.30 | 2.23 |
| Example 5 | 16,732 | 161,378 | 616,651 | 9.6 | 380,247 | 2.36 | 1.61 | 2.49 |
| Example 6 | 16,405 | 160,194 | 621,341 | 9.8 | 377,451 | 2.36 | 1.68 | 2.51 |
| Example 7 | 16,336 | 158,414 | 619,009 | 9.7 | 385,412 | 2.43 | 1.58 | 2.52 |
| Example 8 | 16,092 | 153,989 | 602,786 | 9.6 | 364,206 | 2.37 | 1.50 | 2.52 |
| Example 9 | 16,272 | 157,705 | 618,782 | 9.7 | 371,080 | 2.35 | 1.47 | 2.50 |
| Example 10 | 16,457 | 162,453 | 628,232 | 9.9 | 392,636 | 2.42 | 1.61 | 2.59 |
| Example 11 | 16,715 | 163,414 | 627,749 | 9.8 | 389,478 | 2.38 | 1.44 | 2.55 |
| Example 12 | 16,665 | 161,713 | 624,948 | 9.7 | 381,640 | 2.36 | 1.46 | 2.54 |
| Example 13 | 16,422 | 159,782 | 623,808 | 9.7 | 383,933 | 2.4 | 1.77 | 2.58 |
| Example 14 | 16,246 | 158,138 | 627,307 | 9.7 | 380,574 | 2.41 | 1.53 | 2.58 |
| Example 15 | 16,283 | 155,930 | 604,437 | 9.6 | 370,461 | 2.38 | 1.67 | 2.52 |
| Example 16 | 16,297 | 154,573 | 607,041 | 9.5 | 367,862 | 2.38 | 1.52 | 2.53 |
| Example 17 | 14,727 | 144,684 | 510,766 | 9.8 | 304,403 | 2.10 | 1.19 | 2.13 |
| Example 18 | 14,428 | 145,509 | 520,850 | 10.1 | 310,474 | 2.13 | 1.44 | 2.20 |
| Example 19 | 15,014 | 149,923 | 532,172 | 10.0 | 316,994 | 2.11 | 1.40 | 2.21 |

CDF and LSP data for the various comparative examples and examples was measured according to the testing procedures disclosed herein, as shown in Table 8 below.

Viscosity data for the various comparative examples and examples was measured according to the testing procedures disclosed herein, as shown in Table 9 below.

TABLE 8

| Description | CDF IR ≤ 10,000 g/mol | CDF IR ≥ 500,000 g/mol | CDF DV ≤ 50,000 g/mol | CDF DV ≥ 1,200,000 g/mol | CDF LS ≤ 100,000 g/mol | CDF LS ≥ 750,000 g/mol | LSP |
|---|---|---|---|---|---|---|---|
| Comparative Example 1 | 0.120 | 0.038 | 0.176 | 0.026 | 0.102 | 0.477 | 2.08 |
| Example 1 | 0.133 | 0.065 | 0.152 | 0.033 | 0.084 | 0.484 | 1.57 |
| Example 2 | 0.135 | 0.062 | 0.155 | 0.031 | 0.083 | 0.478 | 1.26 |
| Example 3 | 0.135 | 0.062 | 0.155 | 0.032 | 0.085 | 0.479 | 1.32 |
| Comparative Example 2 | 0.141 | 0.086 | 0.155 | 0.071 | 0.064 | 0.614 | 2.52 |
| Comparative Example 3 | 0.139 | 0.052 | 0.175 | 0.035 | 0.085 | 0.531 | 2.12 |
| Example 4 | 0.142 | 0.059 | 0.159 | 0.028 | 0.106 | 0.379 | 0.89 |
| Example 5 | 0.128 | 0.072 | 0.151 | 0.034 | 0.084 | 0.458 | 1.9 |
| Example 6 | 0.129 | 0.071 | 0.148 | 0.035 | 0.082 | 0.463 | 1.9 |
| Example 7 | 0.130 | 0.069 | 0.150 | 0.035 | 0.086 | 0.462 | 1.88 |
| Example 8 | 0.132 | 0.066 | 0.158 | 0.031 | 0.092 | 0.449 | 1.52 |
| Example 9 | 0.130 | 0.069 | 0.152 | 0.033 | 0.092 | 0.451 | 1.78 |
| Example 10 | 0.128 | 0.072 | 0.147 | 0.035 | 0.090 | 0.461 | 1.99 |
| Example 11 | 0.129 | 0.074 | 0.145 | 0.035 | 0.082 | 0.470 | 2.05 |
| Example 12 | 0.128 | 0.072 | 0.149 | 0.034 | 0.094 | 0.454 | 1.97 |
| Example 13 | 0.130 | 0.071 | 0.148 | 0.035 | 0.088 | 0.464 | 1.97 |
| Example 14 | 0.131 | 0.070 | 0.151 | 0.033 | 0.093 | 0.457 | 1.81 |
| Example 15 | 0.131 | 0.068 | 0.151 | 0.032 | 0.087 | 0.457 | 1.8 |
| Example 16 | 0.131 | 0.067 | 0.151 | 0.033 | 0.089 | 0.458 | 1.74 |
| Example 17 | 0.143 | 0.059 | 0.164 | 0.028 | 0.103 | 0.375 | 0.22 |
| Example 18 | 0.146 | 0.060 | 0.156 | 0.027 | 0.101 | 0.386 | 0.75 |
| Example 19 | 0.141 | 0.063 | 0.155 | 0.029 | 0.099 | 0.389 | 1.38 |

TABLE 9

| Description | Viscosity @ 0.1 radians/second and 190° C. (Pa-s) | Viscosity @ 1.0 radians/second and 190° C. (Pa-s) | Viscosity @ 10 radians/second and 190° C. (Pa-s) | Viscosity @ 100 radians/second and 190° C. (Pa-s) | Viscosity Ratio (V @ 0.1/ V (@ 100) and 190° C. | Tan delta @ 0.1 and 190° C. |
|---|---|---|---|---|---|---|
| Comparative Example 1 | 47,205 | 15,791 | 4,116 | 910 | 51.9 | 1.35 |
| Example 1 | 44,320 | 14,340 | 3,704 | 818 | 54.2 | 1.25 |
| Example 2 | 41,026 | 13,604 | 3,578 | 800 | 51.3 | 1.30 |
| Example 3 | 40,780 | 13,482 | 3,538 | 789 | 51.7 | 1.30 |
| Comparative Example 2 | 35,632 | 11,901 | 3,168 | 720 | 49.5 | 1.30 |
| Comparative Example 3 | 35,205 | 12,207 | 3,295 | 753 | 46.8 | 1.42 |
| Example 4 | 40,469 | 13,313 | 3,496 | 783 | 51.7 | 1.29 |
| Example 5 | 50,250 | 15,604 | 3,918 | 849 | 59.2 | 1.18 |
| Example 6 | 56,493 | 17,130 | 4,205 | 899 | 62.8 | 1.12 |
| Example 7 | 52,770 | 16,310 | 4,064 | 878 | 60.1 | 1.16 |
| Example 8 | 36,221 | 11,050 | 2,740 | — | — | 1.14 |
| Example 9 | 49,226 | 15,364 | 3,879 | 841 | 58.5 | 1.18 |
| Example 10 | 55,222 | 16,744 | 4,113 | 877 | 63.0 | 1.12 |
| Example 11 | 56,476 | 17,059 | 4,170 | 886 | 63.7 | 1.12 |
| Example 12 | 55,395 | 16,736 | 4,086 | 869 | 63.8 | 1.11 |
| Example 13 | 51,778 | 15,822 | 3,935 | 845 | 61.3 | 1.14 |
| Example 14 | 49,601 | 15,331 | 3,842 | 830 | 59.8 | 1.16 |
| Example 15 | 48,512 | 15,219 | 3,855 | 838 | 57.9 | 1.19 |
| Example 16 | 47,008 | 14,856 | 3,781 | 825 | 57.0 | 1.20 |
| Example 17 | 44,229 | 14,199 | 3,657 | 805 | 54.9 | 1.24 |
| Example 18 | 41,938 | 13,629 | 3,539 | 783 | 53.5 | 1.27 |
| Example 19 | 48,518 | 15,243 | 3,862 | 840 | 57.8 | 1.20 |

Branching data in branches per 1000 C by $^{13}$C NMR for the various comparative examples and examples was measured according to the testing procedures disclosed herein, as shown in Table 10 below.

TABLE 10

| Description | C1 (per 1000 total carbons) | 1,3 diethyl branches (per 1000 total carbons) | C2 on Quaternary Carbon (per 1000 total carbons) | C4 (per 1000 total carbons) | C5 (per 1000 total carbons) | C6+ (per 1000 total carbons) |
|---|---|---|---|---|---|---|
| Comparative Example 1 | 2.3 | 4.1 | 1.0 | 6.5 | 2.3 | 3.0 |
| Example 1 | 2.0 | 3.2 | 1.0 | 6.3 | 2.0 | 3.4 |
| Example 2 | 2.0 | 3.3 | 1.1 | 6.4 | 1.9 | 3.3 |
| Example 3 | 2.1 | 3.7 | 1.2 | 6.6 | 2.2 | 3.3 |
| Comparative Example 2 | 0.5 | 4.7 | 1.6 | 7.1 | 2.5 | 3.6 |
| Comparative Example 3 | 1.6 | 3.8 | 1.2 | 6.6 | 2.4 | 3.5 |
| Example 4 | 2.6 | 4 | 1.2 | 6.5 | 2.3 | 3.4 |
| Example 5 | 2.3 | 3.5 | 1.2 | 6.7 | 2.1 | 3.2 |
| Example 6 | 2.2 | 3.6 | 1.1 | 6.7 | 2 | 3 |
| Example 7 | 2.3 | 3.6 | 1.4 | 6.6 | 2.2 | 3.3 |

Unsaturation data by $^{1}$H NMR for the various comparative examples and examples was measured according to the testing procedures disclosed herein, as shown in Table 11 below.

TABLE 11

| Description | vinyl (per 1000 total carbons) | Cis and trans vinylenes (per 1000 total carbons) | trisubstituted (per 1000 total carbons) | vinylidene (per 1000 total carbons) | total unsaturation (per 1000 total carbons) |
|---|---|---|---|---|---|
| Comparative Example 1 | 0.16 | 0.06 | 0.04 | 0.14 | 0.40 |
| Example 1 | 0.15 | 0.05 | 0.05 | 0.15 | 0.41 |
| Example 2 | 0.16 | 0.06 | 0.05 | 0.15 | 0.42 |
| Example 3 | 0.15 | 0.06 | 0.05 | 0.15 | 0.40 |
| Comparative Example 2 | 0.07 | 0.05 | 0.07 | 0.18 | 0.36 |
| Comparative Example 3 | 0.12 | 0.05 | 0.05 | 0.11 | 0.33 |
| Example 4 | 0.183 | 0.055 | 0.022 | 0.177 | 0.437 |
| Example 5 | 0.166 | 0.053 | 0.022 | 0.174 | 0.415 |
| Example 6 | 0.155 | 0.054 | 0.017 | 0.159 | 0.385 |
| Example 7 | 0.166 | 0.060 | 0.024 | 0.163 | 0.413 |

Blown Film Comprising LDPE

Monolayer films having a target thickness of 2 mils are produced from the examples and comparative examples on a blown film line. The blown film line is equipped with a screw single screw extruder using a 3.5 inch Davis Standard Barrier II screw. A target temperature profile during extrusion is 177° C., 218° C., 193° C., 163° C., 163° C., 221° C., and 227° C. through barrels 1-5, the screen block, and lower-upper die respectively. To produce the films, the compositions are sent to the 8 inch diameter blown film die with a 40 mil die gap and an output rate of 10.4 lb/hr/in of die circumference. A target melt temperature is 227° C., and the blow-up ratio is maintained at 2.5 to 1. The air temperature in the air ring and air cooling unit is 7.2° C. The frost line height is an average of 34 inches. Film thickness is controlled within ±10% at 2 mils by adjusting the nip roller speed. The lay flat of the bubble is 31 inches wide. The films are wound up into a roll. General blown film parameters, used to produce each blown film, are shown in Table 12. The temperature profile are the temperatures starting closest to the pellet hopper (Barrel 1), and in increasing order, as the polymer was extruded through the die.

TABLE 12

| | |
|---|---|
| Blow up ratio (BUR) | 2.5 |
| Film thickness (mil) | 2.0 |
| Die gap (mil) | 40 |
| Air temperature (° C.) | 7.2 |
| Temperature profile (° C.) | |
| Barrel 1 | 177 |
| Barrel 2 | 212 |
| Barrel 3 | 193 |
| Barrel 4 | 163 |
| Barrel 5 | 163 |
| Screen Temperature | 221 |
| Adapter | 221 |
| Block | 221 |
| Lower Die | 227 |
| Inner Die | 227 |
| Upper Die | 227 |

Performance Data for the film is provided in Table 13 below.

TABLE 13

| Example | CE 1 | Ex 2 | CE 2 | CE 3 |
|---|---|---|---|---|
| Thickness (mil) | 1.95 | 1.96 | 1.95 | 2.00 |
| Haze (%) | 11.1 | 19.0 | 27.5 | 13.4 |

TABLE 13-continued

| Example | CE 1 | Ex 2 | CE 2 | CE 3 |
|---|---|---|---|---|
| Gloss (45°) | 51.1 | 35.9 | 26 | 45.5 |
| Clarity (%) | 88.5 | 71.5 | 58.1 | 82.3 |
| Dart (g) | 240 | 207 | 213 | 219 |
| Puncture (ft-lb/in$^3$) | 89 | 78 | 73 | 81 |
| MD Tear (g$_f$) | 232 | 233 | 215 | 275 |
| CD Tear (g$_f$) | 223 | 143 | 165 | 196 |
| MD Normalized Tear (g$_f$/mil) | 112 | 110 | 103 | 131 |
| CD Normalized Tear (g$_f$/mil) | 105 | 68 | 77 | 93 |
| Avg MD/CD Stress at Yeild (psi) | 1571/1588 | 1713/1665 | 1652/1579 | 1587/1592 |
| Avg MD/CD Strain at Yield (%) | 12.7/10.4 | 12.4/8.7 | 12.5/9.8 | 11.9/10.1 |
| Avg. MD/CD Stress at Break (psi) | 3638/3243 | 3669/3157 | 2996/2930 | 3435/2956 |
| Avg. MD/CD Strain at Break (%) | 277/509 | 207/497 | 215/495 | 277/512 |
| Avg. MD/CD Energy to Break (in * lbf) | 33.9/40.8 | 26.9/39.5 | 22.9/38.1 | 32.1/38.6 |

As shown above in Table 13, Example 2 has an improved haze over Comparative Examples 1-3. Without being bound by any particular theory, it is believed that this improved haze results from the combination of a narrow Mw/Mn ratio and melt index (I$_2$) of the inventive LDPE according to embodiments disclosed and described herein. In addition, the LSP value of Example 2 is also improved, which may lead to an improved melt strength and processability. It should also be noted that although the LDPE of embodiments disclosed and described herein have improved haze, melt strength, and processability, the other mechanical properties of the film are similar to the mechanical properties of comparative films, which shows that films made from LDPE according to embodiments disclosed and described herein provide a good balance of properties in addition to better visual properties, melt strength, and processability.

The invention claimed is:
1. A low density polyethylene (LDPE) comprising:
a GPC-light scattering parameter (LSP) less than 2.00;
a z-average molecular weight Mz(conv) that is greater than 520,000 g/mol and less than or equal to 800,000 g/mol;
a melt index I$_2$ measured at 190° C. that is less than or equal to 0.20 g/10 min;
a conventional GPC Mw/Mn that is greater than or equal to 8.4 and less than or equal to 10.6; and a ratio of viscosity measured at 0.1 radians/second and 190° C. to a viscosity measured at 100 radians/second and 190° C. that is greater than or equal to 50.0 and less than or equal to 65.0.

2. The LDPE of claim 1, wherein the z-average molecular weight Mz(conv) is greater than 520,000 g/mol and less than 700,000 g/mol.

3. The LDPE of claim 1, wherein the ethylene-based polymer comprises a density that is greater than or equal to 0.915 g/cm$^3$ and less than or equal to 0.930 g/cm$^3$.

4. The LDPE of claim 1, wherein the ethylene-based polymer comprises a GPC Mw (abs)/Mw (conv) that is greater than or equal to 2.00 and less than or equal to 2.60.

5. The LDPE of claim 1, wherein the ethylene-based polymer comprises a melt strength measured at 190° C. that is greater than or equal to 27 cN.

6. The LDPE of claim 1, wherein the melt index $I_2$ measured at 190° C. is greater than or equal to 0.05 g/10 min and less than or equal to 0.20 g/10 min.

7. A film comprising the LDPE of claim 1.

8. A film comprising a mixture of linear low density polyethylene (LLDPE) and the LDPE of claim 1.

9. A molded article, coating, fiber, woven fabric, or non-woven fabric comprising the LDPE of claim 1.

10. A LDPE comprising:
    a GPC-light scattering parameter (LSP) less than 2.00;
    a conventional GPC Mw/Mn that is greater than or equal to 8.4 and less than or equal to 10.6;
    a ratio of viscosity measured at 0.1 radians/second and 190° C. to a viscosity measured at 100 radians/second and 190° C. that is greater than 50;
    a z-average molecular weight Mz(conv) that is greater than 500,000 g/mol and less than or equal to 800,000 g/mol; and
    wherein the ethylene-based polymer comprises a melt strength measured at 190° C. that is greater than or equal to 27 cN.

11. The LDPE of claim 10, wherein the z-average molecular weight Mz(conv) is greater than 520,000 g/mol and less than 700,000 g/mol.

12. The LDPE of claim 10, wherein the ethylene-based polymer comprises a melt strength measured at 190° C. that is greater than or equal to 28 cN.

13. The LDPE of claim 10, wherein the GPC-light scattering parameter (LSP) is less than or equal to 1.60.

14. The LDPE of claim 10, wherein the viscosity ratio is greater than or equal to 50.0 and less than or equal to 65.0.

15. The LDPE of claim 10, wherein the ethylene-based polymer comprises a density that is greater than or equal to 0.915 g/cm$^3$ and less than or equal to 0.930 g/cm$^3$.

16. The LDPE of claim 10, wherein the ethylene-based polymer comprises a GPC Mw (abs)/Mw (conv) that is greater than or equal to 2.00 and less than or equal to 2.60.

17. A film comprising the LDPE of claim 10.

18. A film comprising a mixture of linear low density polyethylene (LLDPE) and the LDPE of claim 10.

19. A molded article, coating, fiber, woven fabric, or non-woven fabric comprising the LDPE of claim 10.

20. A low density polyethylene (LDPE) comprising:
    a GPC-light scattering parameter (LSP) less than 2.00;
    a z-average molecular weight Mz(conv) that is greater than 520,000 g/mol and less than or equal to 800,000 g/mol;
    a conventional GPC Mw/Mn that is greater than or equal to 8.4 and less than or equal to 10.6; and
    a ratio of viscosity measured at 0.1 radians/second and 190° C. to a viscosity measured at 100 radians/second and 190° C. that is greater than or equal to 50.0 and less than or equal to 65.0.

* * * * *